US007436545B2

(12) United States Patent
Tomioka et al.

(10) Patent No.: US 7,436,545 B2
(45) Date of Patent: Oct. 14, 2008

(54) METHOD OF FORMING IMAGE, IMAGE FORMING APPARATUS, AND PROGRAM FOR CARRYING OUT THE METHOD

(75) Inventors: Hiroshi Tomioka, Tokyo (JP); Hiroyuki Takuhara, Tokyo (JP); Tsuyoshi Kanke, Kanagawa (JP); Shin-ichi Tochihara, Kanagawa (JP); Shohei Tsutsumi, New York, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

(21) Appl. No.: 10/915,383

(22) Filed: Aug. 11, 2004

(65) Prior Publication Data

US 2005/0041083 A1 Feb. 24, 2005

(30) Foreign Application Priority Data

Aug. 11, 2003 (JP) ............................. 2003-291868

(51) Int. Cl.
*G06K 1/00* (2006.01)
*G06F 15/00* (2006.01)
*H04N 1/60* (2006.01)

(52) U.S. Cl. ........................ 358/1.9; 358/1.8; 358/3.09; 358/3.1; 358/3.11; 358/3.12; 358/515; 358/517; 358/518; 358/519; 358/520; 358/521

(58) Field of Classification Search .................. 358/1.9, 358/1.8, 3.09, 3.1, 3.11, 3.12, 515, 517, 518, 358/519, 520, 521
See application file for complete search history.

(56) References Cited

U.S. PATENT DOCUMENTS 6,051,036 A 4/2000 Kusaki et al. .................. 8/494
6,352,563 B1 3/2002 Kusaki et al. .................. 8/494
6,488,751 B1 12/2002 Takemoto ................ 106/31.13
6,863,359 B2 * 3/2005 Irizawa et al. ................. 347/14
7,232,600 B2 * 6/2007 Misuda .................... 428/195.1
2002/0011178 A1 1/2002 Kanke et al. ............. 106/31.47
2002/0054186 A1 5/2002 Hotomi et al. ................ 347/43

FOREIGN PATENT DOCUMENTS

EP 0 992 551 A2 10/1999
JP 6-57654 A 3/1994
JP 2001-138552 A 5/2001
JP 2002-69348 A 3/2002
WO WO 00/43451 7/2000

* cited by examiner

*Primary Examiner*—Douglas Q Tran
(74) *Attorney, Agent, or Firm*—Fitzpatrick, Cella, Harper & Scinto

(57) ABSTRACT

If an ink for a particular color (for example, red) having an excellent color developing characteristic is used in addition to inks for three primary colors of subtractive color mixture, the high color reproducibility is to be maintained for a long period. To accomplish this, at least one (for example, a yellow ink) of the inks of two colors between which the hue angle of red, included in the three primary colors, is sandwiched is applied to an area of a printing medium to which a red ink is applied so that the inks overlap each other. Thus, the yellow ink, having a high weatherability, is applied to an area on the printing medium to which only the red ink, having a low weatherability, is otherwise applied. It is therefore possible to improve the weatherability while maintaining the color developing characteristic at a high level.

13 Claims, 14 Drawing Sheets

—□— : ONLY PARTICULAR COLOR INK

----×---- : EQUAL AMOUNTS OF PARTICULAR COLOR INK AND YELLOW INK ARE APPLIED SO AS TO OVERLAP EACH OTHER

– – ● – – : PARTICULAR COLOR INK AND YELLOW INK ARE APPLIED SO AS TO OVERLAP EACH OTHER WHILE VARYING AMOUNT OF YELLOW INK APPLIED STEP BY STEP WITH RESPECT TO AMOUNT OF PARTICULAR COLOR INK APPLIED

METHOD OF FORMING IMAGE, IMAGE FORMING APPARATUS, AND PROGRAM FOR CARRYING OUT THE METHOD

BACKGROUND OF THE INVENTION

1. Field of the Invention

The present invention relates to a method of forming an image and an image forming apparatus which method and apparatus use printing agents (for example, inks) for the three primary colors of subtractive color mixture and a printing agent for a particular color having a hue different from those of the three primary colors, and specifically, to a method of forming an image, an image forming apparatus, and a program all of which enable image formation which is excellent in color reproducibility and weatherability.

2. Description of the Related Art

With the recent popularization of information processing equipment such as word processors, personal computers, and facsimile machines, printing apparatuses have been rapidly developed and popularized as image forming terminals that print texts, images, and the like on printing media. The printing apparatuses are based on various systems. Among them, a system is common which forms texts or images by applying printing agents to printing media. The principal printing apparatus for personal use is an ink jet printing apparatus that eject inks as printing agents from ejection openings to execute printing on printing media such as paper, cloths, plastic sheets, or OHP sheets. The ink jet printing apparatus has very excellent characteristics; it is based on a low-noise non-impact printing system, can perform a dense and fast printing operation and deal easily with color printing, and is inexpensive, The ink jet printing apparatus reproduces colors on the basis of subtractive color mixture basically using the three primary colors for printing, yellow, magenta, and cyan. For example, an image in an orange or read area can be formed by mixing yellow with magenta, an image in a green area can be formed by mixing yellow with cyan, and an image in a blue or violet area can be formed by mixing magenta with cyan. Moreover, contrast may be improved and neutral colors may be stably reproduced by executing a UCR process of using a black ink in addition to inks for the three primary colors, extracting a black component K from data Y, M, and C on yellow, magenta, and cyan to partly replace the black with this component, and removing an amount of color components C, M, and Y corresponding to the replaced part of the black. In this case, an image is formed using printing agents (inks) for the respective colors, by converting the three color components R, G, and B of the input image data into data Y, M, and C on yellow, magenta, and cyan and into data K on black.

Further, with recent rapid popularization of color ink jet printing apparatuses, image quality has been desired to be further improved. In particular, vivid output images are desired which are obtained by expanding color areas that can be reproduced by printing apparatuses. In contrast, for a color area that can be reproduced by only one of the three colors yellow, magenta, and cyan, a color reproduced area can be expanded by improving the color developing characteristics of color materials for the individual printing agents (inks) or the concentrations of the color materials. However, for a color area with a particularly high chroma within a red, green, or blue area formed using printing agents for two or more colors, the reproducible color area is limited if only three colors, that is, yellow, magenta, and cyan, or only four colors, that is, these three colors plus black are used. Consequently, more vivid color reproductions are difficult.

In connection with the expansion of the color reproduction area, Japanese Patent Application Laid-open No. 6-57654 (1994) discloses a method of forming an image by using not only printing agents for the four basic colors yellow, magenta, cyan, and black but also a printing agent for a particular color that is a high-chroma color different from the three primary colors of subtractive color mixture, that is, red (orange), green, and blue (violet).

Further, Japanese Patent Application Laid-open No. 2001-138552 discloses a method of forming an image by using printing agents for the four basic colors yellow, magenta, cyan, and black, and by adding printing agents for light cyan and light magenta having lower color material densities than cyan and magenta, respectively, and particular colors including printing agents for orange and green. Both patents use particular color with high chroma in order to reproduce vivid colors that cannot be reproduced using only yellow, magenta, cyan, and black.

SUMMARY OF THE INVENTION

However, Japanese Patent Application Laid-open Nos. 6-57654(1994) and 2001-138552 do not consider the weatherability of images formed using a particular color printing agent. Thus, even though the color reproduction range can be increased and images with an excellent color developing characteristic can be formed using a particular color printing agent, the color developing characteristic of the images cannot be maintained for a long period. That is, Japanese Patent Application Laid-open Nos. 6-57654(1994) and 2001-138552 do not make it possible to maintain the color developing characteristic for a long period, which is the greatest advantage of the employment of the particular colors.

In view of these circumstances, it is an object of the present invention to provide a method of forming an image, an image forming apparatus, and a program wherein of a particular color printing agent having an excellent color developing characteristic is used, the colors can be appropriately reproduced over a long period.

In the first aspect of the present invention, there is provided a method of forming an image on a printing medium using printing agents for basic colors including cyan, magenta, and yellow and a printing agent for a particular color having a hue different from those of the basic colors, wherein at least one basic color printing agent having a higher weatherability than the particular color printing agent is applied to an area on the printing medium to which the particular color printing agent is applied.

In the second aspect of the present invention, there is provided a method of forming an image on a printing medium using printing agents for basic colors including cyan, magenta, and yellow and a printing agent for a particular color exhibiting, in a CIE-L*a*b* space, a hue angle within a color reproduction area expressed by two of the three basic colors, wherein if an image which contains a color within the color reproduction area expressed by the two basic colors is formed, the particular color printing agent and at least one of the basic color printing agents, which has a higher weatherability than the particular color printing agent are used.

In the third aspect of the present invention, there is provided a method of forming an image on a printing medium using printing agents for basic colors including cyan, magenta, and yellow and a printing agent for a particular color having a hue different from those of the basic colors, the method comprising:

a step of generating pixel data corresponding to one pixel expressed using the particular color printing agent, and wherein in the step of generating the pixel data, the image data is generated so that data corresponding to the particular color printing agent and data corresponding to data on at least one basic color printing agent having a higher weatherability than the particular color printing agent are contained.

In the fourth aspect of the present invention, there is provided a method of forming an image on a printing medium using printing agents for basic colors including cyan, magenta, and yellow and a printing agent for a particular color exhibiting, in a CIE-L*a*b* space, a hue angle within a color reproduction area expressed by two of the three basic colors, the method comprising:

a step of converting RGB data corresponding to one pixel into pixel data corresponding to printing agents used for the image formation and then outputting the pixel data, and wherein in the output step, when if pixel data which corresponds to a color within the color reproduction area expressed by the two basic colors is outputted, the pixel data is outputted so that data corresponding to the particular color printing agent and data corresponding to data on at least one basic color printing agent having a higher weatherability than the particular color printing agent are contained.

In the fifth aspect of the present invention, there is provided a method of forming an image on a printing medium using printing agents for basic colors including cyan, magenta, and yellow and a printing agent for a particular color having a hue different from those of the basic colors, the method comprising:

a step of converting multivalued RGB data into multivalued data corresponding to the printing agents used for the image formation; and a step of executing predetermined image processing on the multivalued data corresponding to the printing agents to obtain binary data and applying the printing agents to the printing medium on the basis of the binary data, and wherein in the converting step, even if a color expressed by the unconverted RGB data can be expressed using only the particular color printing agent, the multivalued RGB data is converted into multivalued data corresponding to the particular color printing agent and multivalued data corresponding to at least one basic color printing agent having a higher weatherability than the particular color printing agent.

In the sixth aspect of the present invention, there is provided an n image forming apparatus comprising:

means for mounting means for applying printing agents for basic colors including cyan, magenta, and yellow and a printing agent for a particular color having a hue different from those of the basic colors; and means for forming an image on a printing medium by performing any one of the above method.

In the seventh aspect of the present invention, there is provided a program for causing a computer to generate data used when forming an image on a printing medium using printing agents for basic colors including cyan, magenta, and yellow and a printing agent for a particular color having a hue different from those of the basic colors, the program including codes for performing a step of generating pixel data corresponding to one pixel expressed using the particular color printing agent, and wherein in the step of generating the pixel data, the image data is generated so that data corresponding to the particular color printing agent and data corresponding to data on at least one basic color printing agent having a higher weatherability than the particular color printing agent are contained.

In the eighth aspect of the present invention, there is provided a program for causing a computer to generate data used when forming an image on a printing medium using printing agents for basic colors including cyan, magenta, and yellow and a printing agent for a particular color exhibiting, in a CIE-L*a*b* space, a hue angle within a color reproduction area expressed by two of the three basic colors, the program including codes for performing a step of converting RGB data corresponding to one pixel into pixel data corresponding to printing agents used for the image formation and then outputting the pixel data, and wherein in the output step, when if pixel data which corresponds to a color within the color reproduction area expressed by the two basic colors is outputted, the pixel data is outputted so that data corresponding to the particular color printing agent and data corresponding to data on at least one basic color printing agent having a higher weatherability than the particular color printing agent are contained.

In the ninth aspect of the present invention, there is provided a program for causing a computer to generate data used when forming an image on a printing medium using printing agents for basic colors including cyan, magenta, and yellow and a printing agent for a particular color having a hue different from those of the basic colors, the program including codes for performing a step of converting multivalued RGB data into multivalued data corresponding to the printing agents used for the image formation; and wherein in the converting step, even if a color expressed by the unconverted RGB data can be expressed using only the particular color printing agent, the multivalued RGB data is converted into multivalued data corresponding to the particular color printing agent and multivalued data corresponding to at least one basic color printing agent having a higher weatherability than the particular color printing agent.

In this specification, a particular color is defined in a broad sense as those different in hue from yellow, magenta and cyan which are printing agents of basic colors. In a narrow sense, the particular color is defined as colors capable of representing at least one of higher lightness and chroma in a CIE-L*a*b* color space than in a color reproduction area represented on the printing medium by the combination of any two basic color printing agents; magenta, yellow and cyan; as well as a color representing a hue angle in the color reproduction area represented by the above-mentioned combination of any two printing agents.

In the present invention, the printing agent of the particular color in the narrow sense described above is preferably used, but the wide sense may also be used.

In the present invention, inks are suitably used as printing agents. However, printing agents other than inks (for example, toners) may also be used.

According to the present invention, a particular color ink having a low weatherability and at least one ink of another color having a higher weatherability than the particular color ink are printed so as to overlap each other. Therefore, the weatherability can be improved while maintaining the excellent color developing characteristic of the particular color.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The present invention will be described in detail below with reference to the attached drawings.

(General Description about Printing System)

Hereinafter, an ink jet type printing system employing seven reference or basic colors of inks such as cyan, magenta, yellow, red, green, blue and black is exemplified. Such printing system is subjected to be applied with the present invention.

Figure 1:
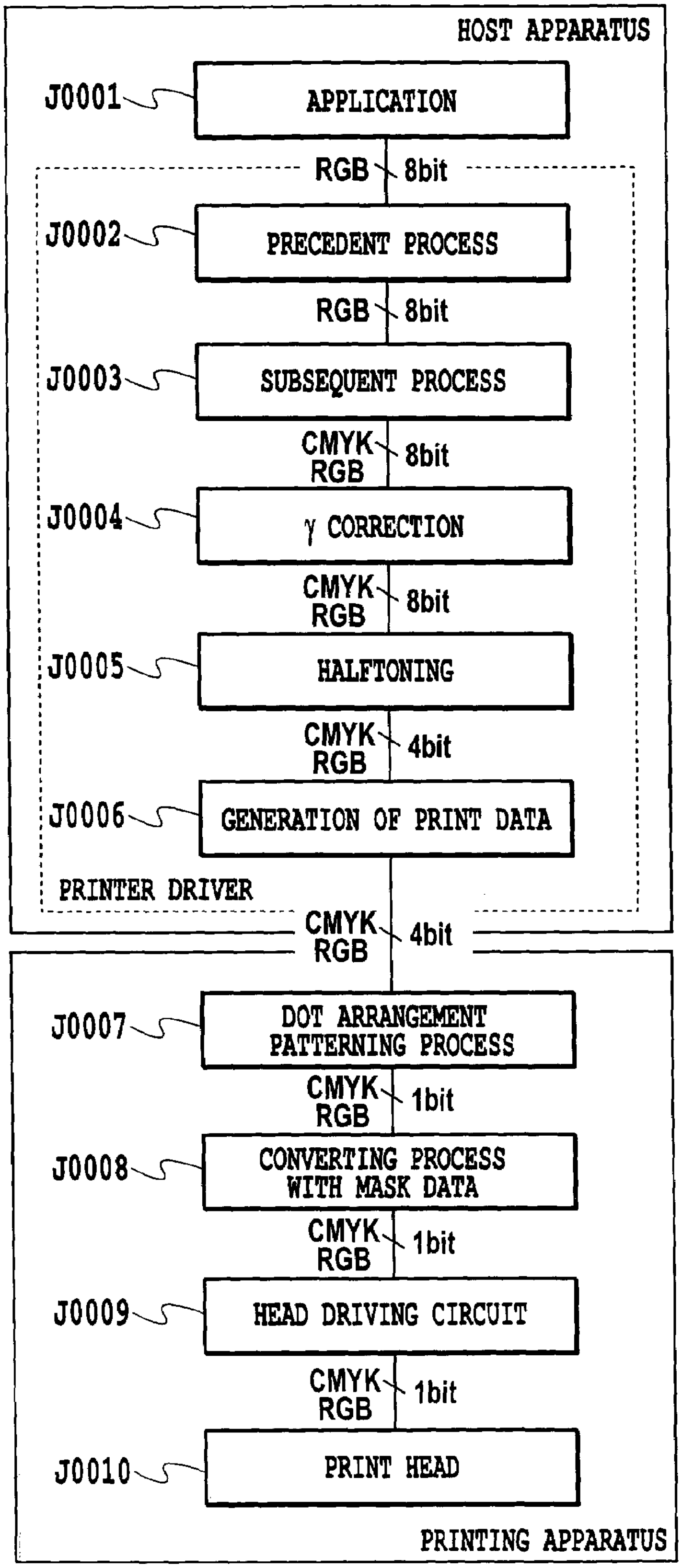
FIG. 1 is a block diagram showing the configuration of a print system according to an embodiment of the present invention.

FIG. 1 is a block diagram showing a structure of a printing system as an example to which the present invention is applicable. The image forming device of the present embodiment performs printing using the above stated seven color inks. Therefore, recording heads for ejecting these seven color inks is employed. As shown in FIG. 1, the printing system of the present embodiment comprises a recording device as an image forming device and a personal computer (PC) as a host apparatus.

There are applications and printer drivers as programs which are operative by operating systems of the host apparatus. Application J0001 executes a process for forming an image data to be printed by a printer. The image data or data prior to being edited can be downloaded to a PC via various media. The PC according to the present embodiment can download an image data from a digital camera, e.g. an image data of a JPEG type, via a CF card. The PC can also download an image data scanned from a scanner, e.g. an image data of a TIFF type, and an image data that has been stored in a CD-ROM. The PC can further download data on a web site through the internet. Each downloaded data is displayed on a monitor, followed by data-organization, editing thereof and the like via application J0001, resulting, for example, in a formation of image data R, G, B of a sRGB standard. Then, the image data is sent to the printer driver in accordance with a printing instruction.

The printer driver according to the present embodiment includes processes of precedent process J0002, subsequent process J0005, γ correction process J0004, halftonning process J0005, and print data creation process J0006. Precedent process J0002 performs mapping of a gamut.

Precedent process J0002 according to the present embodiment performs data conversion of an 8-bit image data R, G, B into data R, G, B in the gamut of the printer. The data conversion uses three dimensional LUT including a relation to map the gamut reproduced by the image data R, G, B of the sRGB standard to the gamut reproduced by printer 2000 of the present print system, simultaneously using an interpolating operation. Subsequent process J0003, based on the data R, G, B to which mapping of the gamut has been made as stated above, performs a processing to obtain a combination of inks which may reproduce the color represented by the mapped data, i.e. a color separation data Y, M, C, K, R, G and B corresponding respectively to yellow, magenta, cyan, black, red, green and blue. According to the present embodiment, this process is performed, in a similar manner as the precedent process, by a combination of the three dimensional LUT and the interpolating operation. γ correction process J0004 performs a tone value conversion of data of each color of the color separation data detected by subsequent process J0003. More specifically, by using a one dimensional LUT in accordance with a tone property of each ink of the printer employed with the present system, a conversion is performed such that the above color separation data linearly corresponds to the tone property of the printer. Halftonning process J0005 carries out quantization in which each of the 8-bit color separation data Y, M, C, K, R, G and B is converted to 4-bit data. The present embodiment employs an error diffusion method for converting the 8-bit data into 4-bit data. This 4-bit data serves as an index for showing an arrangement pattern in patterning process of dot arrangement in the printing apparatus. Finally, print data creating process J0006 creates print data in which print control information is added to a print image data including the above 4-bit index data. Processes for the above application and printer driver are performed by the CPU in accordance with their programs. At the time, the program is read out from a ROM or a hard disk to be applied. Upon execution of the processes, a RAM is used as a working area.

The printing apparatus performs dot arrangement patterning process J0007 and mask data conversion process J0008 with regard to data processing. Dot arrangement patterning process J0007 arranges dots in accordance with a dot arrangement pattern corresponding to 4-bit index data (tone value information), that is a print image data, for each pixel corresponding to an actual print image. Each pixel represented by the 4-bit data is assigned a dot arrangement pattern corresponding to a tone value of the pixel. As a result, each of a plurality of areas within the pixel is defined with an on/off state, and an ejection data of “1” or “0” will be assigned to each area in one pixel. Thus, obtained 1-bit ejection data will be provided with masking by mask data conversion process J0008. In other words, ejection data of each scan for completing printing of a scanning area of a predetermined width by a printing head with a plurality of scans is generated by the process using masks respectively corresponding to each scan. Each ejection data Y, M, C, K, R, G and B of each scan is sent to head driving circuit J0009 at an appropriate timing, thereby driving the printing head J0010 to eject each ink in accordance with the ejection data. Here, the above stated dot arrangement patterning process and mask data conversion process in the printing head J0010 are executed, using a hardware circuit proprietary thereto, under control of a CPU constituting a controlling section of the printing apparatus. These processes may be performed by a CPU following the application program. The above processes may be carried out by, for example, the printer driver of the PC. Upon an application of the present invention, as it is apparent from an explanation below, the processing mode should not be construed as being limited to the modes as set forth herein.

The printer of the present embodiment as set forth above employs inks of red, green and blue as particular colors. Here, the particular colors refer to hues of colors that are different from the basic color inks such as the three colors of yellow, magenta and cyan, more specifically, colors representing a hue angle between two colors among three colors. In the present embodiment, further specifically, the particular colors refer to colors that can realize high chroma and lightness higher than the colors having the same hues in secondary colors made by the mixture. In other words, “particular color” of the present embodiment refers to, in CIE-L*a*b* color space, the hue angle within a color reproduction area expressed by a combination of any two printing agents among basic color printing agents of magenta, yellow and cyan. The “particular color” of the present embodiment further refers to the color of high chroma and lightness higher than the colors of the color reproduction gamut expressed on the printing medium by the combination of two printing agents.

Also, especially the particular color ink of red according to the present embodiment is possible to reproduce the high chroma and lightness higher than the color in the color space in which the image data R, G, B of sRGB standard of monitors or the like can be reproduced.

In the present description, the inks as the printing agents are respectively referred to as Cyan, Magenta, Yellow and Black, and the colors or data and hues of the inks are represented by capital letters thereof such as C, M, Y and K. That is, C represents cyan color, its data or its hue; M represents magenta color, its data or its hue; Y represents yellow color, its data or its hue; K represents black color, its data or its hue; R represents red color, its data or its hue; G represents green color, its data or its hue; and B represents blue color, its data or its hue, respectively.

In the specification, the term “pixel” refers to a minimum unit that can be expressed in accordance with tone or gradation or a minimum unit to undergo image processing (the above stated processes such as precedent process, subsequent process, γ correction process, halftonning process) of multi-valued data of multiple bits. One pixel is associated with a dot arrangement pattern composed of m×n (for example, 4×2) squares. Each of the squares in one pixel is defined as an area. The area is a minimum 5unit for which a dot is defined to be turned on or off. In connection with this, the “image data” in precedent process, subsequent process, or γ correction is pixel data itself to be processed. In the halftonning according to the present embodiment, image data containing 8-bit gradation values (256 gradations) into image data (index data) containing 4-bit gradation values (9 gradations).

(Summary of Image Formation)

The method of forming an image according to the present invention is characterized by the use of chromatic color inks of the basic colors cyan, magenta, and yellow and at least one particular color ink that is a chromatic color ink having a hue different from those of the basic colors. The method is also characterized in that if an image is formed by applying droplets of these inks to a printed medium in accordance with image data, then for an area in the printing medium to which the particular color ink is applied, an ink that has a higher weatherability than the particular color ink is allowed to overlap the particular color ink. This makes it possible to provide prints having images durable enough to maintain the high color reproducibility inherent in the particular color ink for a long period.

With the present embodiment, in subsequent process J0003, 8-bit RGB data is converted into 8-bit color separation data CMYKRGB (CMYKRGB data corresponding to ink colors). In this case, the conversion is executed so that a basic color ink with a high weatherability is also applied to a pixel to which a particular color ink is to be applied. Specifically, in the subsequent process, the RGB data is converted into CMYKRGB data corresponding to the ink colors by using interpolating operations and a three-dimensional LUT in which the RGB data is associated with the CMYKRGB data corresponding to the ink colors, on a one-to-one correspondence. In this case, even if a color expressed by the unconverted RGB data can be reproduced using only the particular color ink, the three-dimensional LUT is pre-configured so as to convert to data on the particular color ink and at least one basic color ink instead of converting to only data on the particular color ink. In other words, when 8-bit RGB data is converted into 8-bit CMYRGB data for output, if data on the particular color ink is outputted, then in subsequent process J0003, the three-dimensional LUT and interpolating operations are configured so as to output data on at least one of the basic color inks. Accordingly, even if a certain area can be expressed using only the particular color ink, it is printed using both the particular color ink and at least one basic color ink having a high weatherability rather than only the particular color ink.

In the case not only to express a color reproduction area that can be expressed using only the particular color ink but also to express a color reproduction area expressed by two of the three basic colors between which the hue angle of the particular color-ink is sandwiched, it is preferable to use both the particular color printing agent and at least one basic color printing agent having a higher weatherability than the particular color printing agent. That is, when image formation is carried out using printing agents for the basic colors cyan, magenta, and yellow and a printing agent for a particular color showing a hue angle in a color reproduction area expressed by a combination of arbitrary two of the three basic colors, if an image which contains the color in the color reproduction area expressed by the combination of arbitrary two of the three basic colors is formed, it is preferable to use both the particular color printing agent and at least one basic color printing agent having a higher weatherability than the particular color printing agent.

Here, a process will be illustrated, the process being executed using the configuration of the above print system if a red ink corresponding to the particular color has a low weatherability.

If the red ink, having a relatively low weatherability, is used, the process is executed so that a yellow ink and/or a magenta ink, having a higher weatherability than the red ink is applied to a pixel to which the red ink is to be applied.

Specifically, as described above, in subsequent process J0003, when 8-bit RGB data is converted into 8-bit CMYLRGB data for output, if a color expressed by the unconverted RGB data can be reproduced using only the red ink, both R data and Y and/or M data are outputted instead of only R data. Thus, even if a certain gamut can be expressed using only the red ink, having a relatively low weatherability, it is printed using both the red ink and the yellow and/or magenta ink, which has a high weatherability, rather than only the particular color ink. This improves the weatherability of an image in an area in which the red ink is used.

Figure 13:
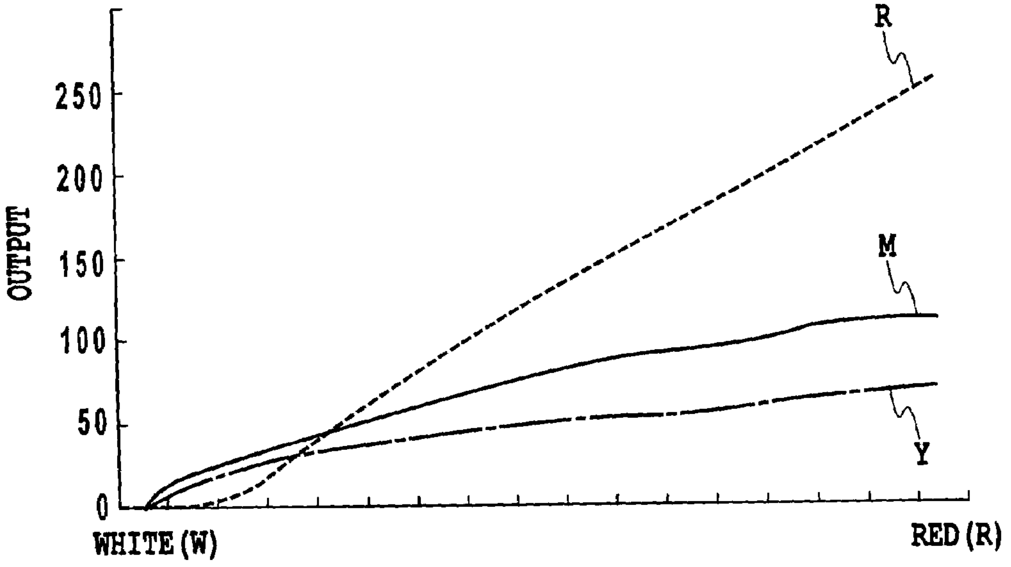
FIG. 13 is a graph illustrating red-hue output obtained using yellow and magenta inks.

Now, an example of output results of the subsequent process is shown which results are obtained if an area in which the red ink is used undergoes color reproduction. FIG. 13 shows an example of color reproduction of an R hue line ranging from white (W) to red (R). The axis of abscissa corresponds to 8-bit values for RGB data and in this case, shows a range from white (W), indicated by (R, G, B)=(255, 255, 255), to red (R), indicated by (R, G, B)=(255, 0, 0). On the other hand, the axis of ordinate shows to 8-bit values for CMYKRGB data corresponding to the output results of the subsequent process. In this case, R, Y, and M data are outputted. The output value is at 256 levels from 0 to 255. The amount of ink impacting one pixel increases with the output value.

As is apparent from FIG. 13, if the R hue line undergoes color reproduction, not only R data but also Y and M data are outputted. Thus, the R hue is reproduced using both the red ink, having a low weatherability, and the yellow and magenta inks, each having a high weatherability. This makes it possible to improve the weatherability of an area exhibiting the R hue.

Further, in this example, with increasing density level, the amount of red ink used increases and the ratio of the amounts of yellow and magenta inks used to the amount of red ink used decreases. That is, the ratio of the amounts of yellow and magenta inks impacting the printing medium to the amount of red ink impacting the printing medium is made higher on a low chroma (low density) side than on a high chroma (high density) side. Such a ratio allows relatively large amounts of yellow and magenta inks, having a high weatherability, to be used on the low chroma (low density) side, on which the weatherability is likely to be degraded. A sufficient weatherability can thus be provided on the low chroma (low density) side. Furthermore, reduced amounts of yellow and magenta inks are used on the high chroma (high density) side to increase the number of pixels in which only the red ink is present. It is thus possible to make full use of the characteristics of the red ink, exhibiting a high color developing characteristic. FIG. 13 shows only a preferred example, and the subsequent process according to the present invention is not limited to this example.

In the above description, the particular color ink overlaps the basic color ink, which has a high weatherability. The term "overlapping" refers both to the perfect superimposition of a dot of the basic color ink, having a high weatherability, on the dot position of the particular color ink and to the partial overlapping of two dots.

Figure 2A:
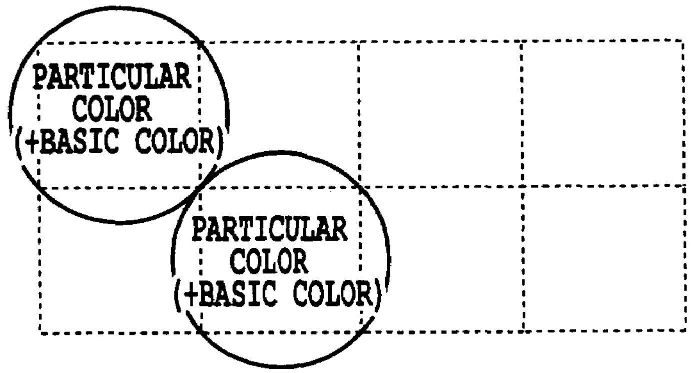
FIGS. 2A to 2C are diagrams illustrating three examples in which particular color ink dots having a low weatherability overlap basic color ink dots having a favorably high weatherability.
Figure 2B:
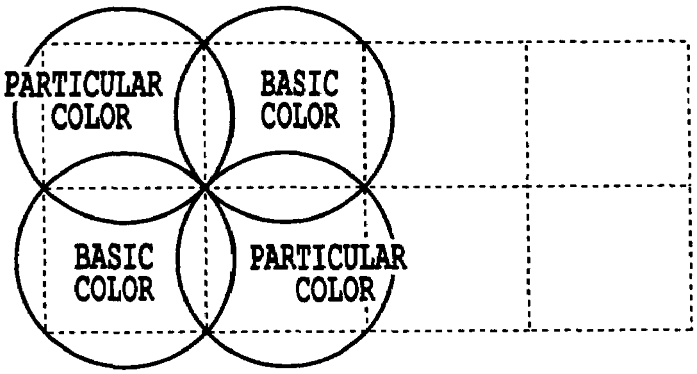
Figure 2C:
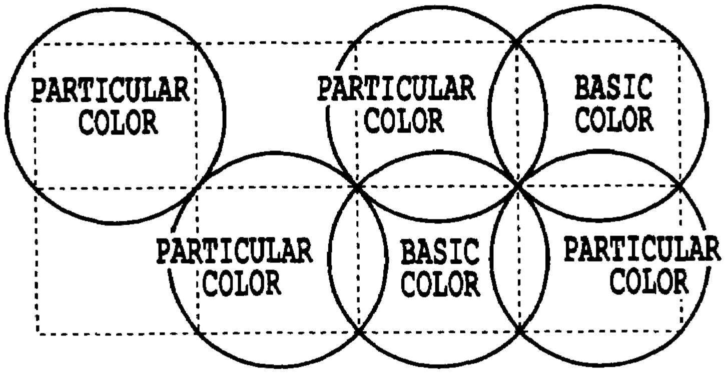

FIGS. 2A to 2C show that one pixel corresponds to a 2×4 area and that an ink dot of the particular color and an ink dot of the basic color are formed within one pixel. FIG. 2A shows that ink dots of the basic color are perfectly superimposed on the respective areas in which ink dots of the particular color are formed. FIG. 2B shows that each ink dot of the basic color is formed in the area in which no ink dots of the particular color are formed so that each ink dot of the particular color and the corresponding ink dot of the basic color partly overlap each other. FIG. 2C shows that no ink dots of the basic color are formed in a certain area, whereas an ink dot of the basic color is present in the adjacent area. In either case, even if any dot of the particular color ink is affected by light such as ultraviolet rays or a gas in the air, the ink having a high weatherability remains to reduce a change in the chromaticness of the entire image after a fading test. This makes it possible to store images for a longer period.

Further, although a mechanism for improving the weatherability is not clear, it is expected that when the high-weatherability ink and the particular color ink are present in the same area, the color material of the high-weatherability ink absorbs light or the gas to relatively reduce the quantity of light or gas attacking the color material of the particular color ink. This is assumed to suppress the degradation of the color material of the particular color ink to improve the weatherability.

The high-weatherability ink overlapping the particular color ink may be applied to a printing medium before or after the particular color ink. That is, on the printing medium, the high-weatherability ink may be placed on the particular color ink or the particular color ink may be placed on the high-weatherability ink. In any case, it is possible to improve the weatherability of the pixel to which the particular color ink is applied.

Further, in the present embodiment, it is not essential that the high-weatherability ink overlaps all the pixels to which the particular color ink is applied. The high-weatherability ink has only to overlap at least some of the pixels to which the particular color ink is applied.

For example, in subsequent process J0003, even if image data containing particular color data and basic color data is outputted, the particular color ink and the basic color ink may fail to overlap each other after subsequent half toning J0005. This is because when an error diffusing process is executed for each color during the half toning J0005, the density level of a focused pixel, the density levels of surrounding pixels, and an error added to the focused pixel vary with the colors. Accordingly, even if image data containing particular color data and basic color data is outputted during the subsequent process, either the particular color ink or the basic color ink may fail to be applied to the pixel. Thus, the basic color ink may fail to be applied to the pixel to which the particular color ink has been applied. However, in addition to pixels to which only the particular color ink is applied, there are a large number of pixels to which both particular color ink and basic color ink are applied. Accordingly, for a macro area corresponding to several to several tens of pixels, both particular color ink and basic color ink are applied to the same area. Therefore, the weatherability in the macro area is improved. The present embodiment includes such an aspect.

Further, it is allowable to intentionally provide pixels to which the particular color ink is applied but which are not overlapped by the high-weatherability ink. That is, subsequent process J0003 may be configured so that some of the pixels to which the particular color ink is applied are overlapped by the high-weatherability ink, whereas others are not.

In short, the present embodiment has only to improve the weatherability in a macro area corresponding to several to several tens of pixels. To accomplish this, it is only necessary to apply both particular color ink and basic color ink in such a macro area. That is, the high-weatherability ink has only to overlap at least some of the pixels to which the particular color ink is applied. Provided that the high-weatherability ink thus overlaps some of the pixels to which the particular color ink is applied, even if dots of the particular color ink are affected by light such as ultraviolet rays or a gas in the air, the high-weatherability remains. This reduces a change in the chromaticness of the entire image after a fading test. This makes it possible to store images for a longer period.

Figure 3:
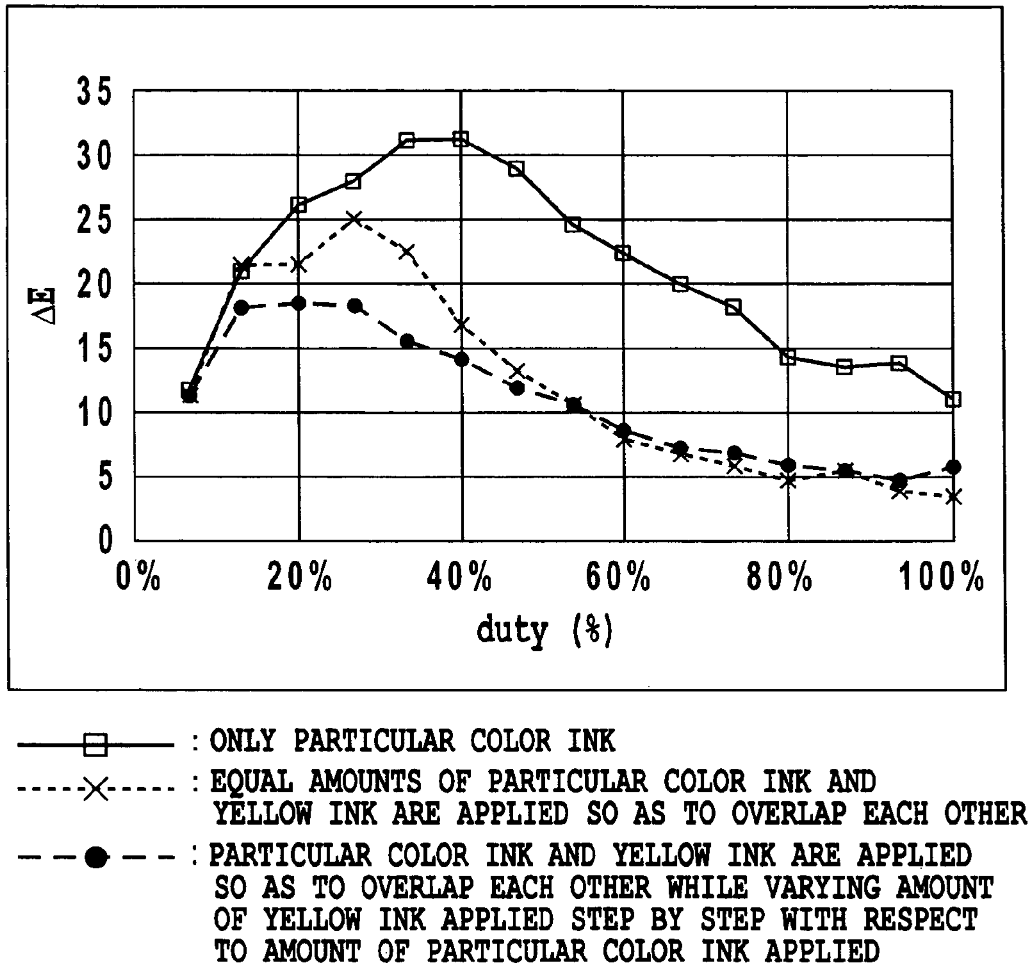
FIG. 3 is a graph showing the relationship between the print duty and weatherability of a particular color ink observed if the particular color ink is solely used and if a basic color ink having a higher weatherability than the particular color ink is allowed to overlap the particular color ink.
Figure 4:
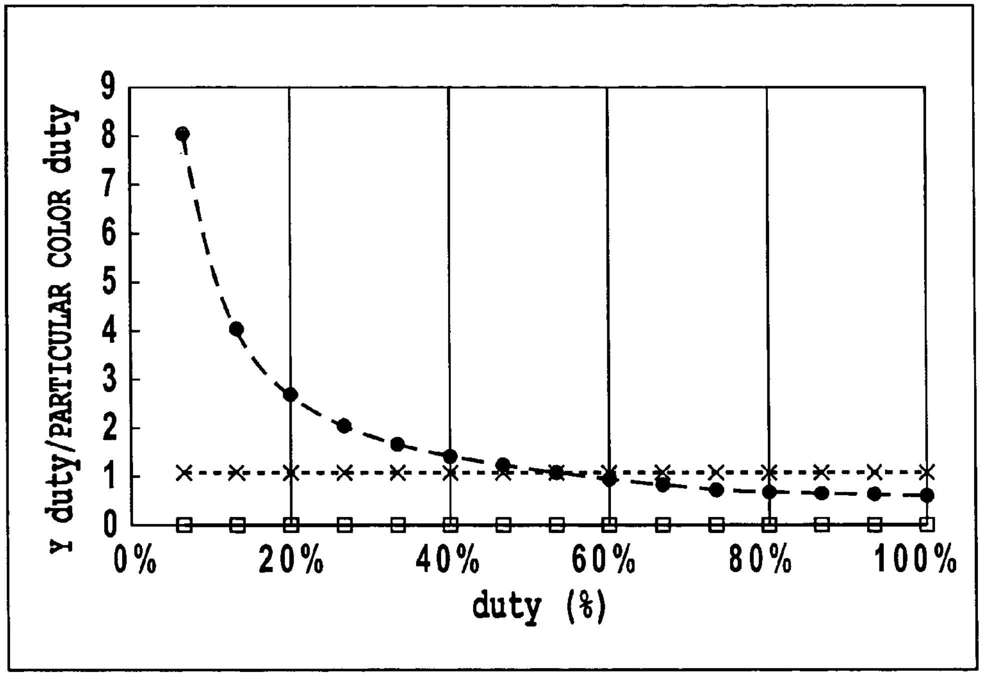
FIG. 4 is a graph showing the print duty of the particular color ink and the application ratio of the basic color ink to the particular color for each pattern shown in FIG. 3.

Now, description will be given of a method for more effectively improving the weatherability of the particular color ink, using the results of an embodiment described later (FIGS. 3 and 4), as an example. FIG. 3 shows the relationship between the print duty and weatherability of the particular color ink observed if the particular color ink (here, an ink of a red hue is used as an example) is solely used (shown by a solid line) and if the yellow ink, having a higher weatherability than the particular color ink, overlaps the particular color ink. In this case, the weatherability increases with decreasing ΔE (color difference) in the figure. The method of overlapping uses a pattern (shown by a thin broken line) in which the same amount of yellow ink as that of particular color ink is applied and a pattern (thick broken line) in which the application ratio of the yellow ink to the particular color ink is varied step by step depending on the print duty of the particular color ink. FIG. 4 is a graph showing the print duty of the particular color ink and the application ratio of the yellow ink to the particular color ink (Y duty/particular color duty) for each pattern.

FIG. 3 indicates that printing with only the particular color ink results in a low weatherability notably in a low duty part. The figure also indicates that the weatherability is improved in all cases by allowing the high-weatherability ink to overlap the particular color ink, as described above. Moreover, by making the application ratio of the high-weatherability ink to the particular color ink higher in a low duty part than in a high duty part, it is possible to more effectively improve the balance of the weatherability and reduce the amount of the high-weatherability ink applied in the high duty part. This in turn makes it possible to increase the amount of particular color ink applied in the high duty part. Consequently, the excellent color developing characteristic can further be improved. The amount of ink applied can be reduced in the high duty part, which otherwise require a larger amount of ink. As a result, running costs can be reduced.

Further, owing to the relationship between the density of a color material applied to a printing medium and the weatherability, the weatherability tends to decrease notably in an area in which the color material density of the particular color ink applied is at most 0.2 mg per square inch. Thus, the weatherability can be effectively improved by applying the high-weatherability ink to this area. In this case, the weatherability can more effectively be improved by applying the high-weatherability ink so that its color material density is at least 0.05 mg per square inch. The term "color material density" as used herein refers to the mass of a coloring agent such as a dye or pigment per unit area (square inch), the coloring agent being contained in a printing agent.

To effectively improve the weatherability of the entire image, it is preferable that the high-weatherability basic color ink applied to the same image area to which the particular color ink is applied has characteristics shown by the equations shown below, in connection with the particular color ink.

$$\Delta E2/\Delta E1=0.8$$

ΔE1: Color difference particular color ink between state before a fading test and state after the fading test ΔE2: Color difference of high-weatherability ink (in this case, yellow ink) between state before a fading test and state after the fading test, ink being applied to the same image area to which particular color ink is applied The term "weatherability" as used herein relates to a photobleach attributed to ultraviolet rays or a gas fading attributed to a gas component such as ozone in the atmosphere. Accordingly, for example, for the photobleach, the fading test uses a xenon lamp to execute exposure irradiation for 30 hours at a bath temperature of 50° C., a relative humidity of 70%, and an irradiation energy of 0.39 W/m$^2$ at 340 nm. For the gas fading, the tests involve exposure for two hours in a 3-ppm ozone atmosphere at a bath temperature of 40° C. and a relative humidity of 55%. In either case, auniform solid pattern is formed on a printing medium so that the amount of ink applied per unit area is 3.6±1.2 mg/inch$^2$. The solid pattern is left and dried in an indoor dark place for 48 hours. Then, the fading tests are carried out and a color developing characteristic is measured before and after the tests using a CIE-L*a*b* colorimetric system to obtain ΔE1 and ΔE2.

In subsequent process J0003, to allow the input of pixel data containing data on red ink (R data) and data on yellow ink (Y data), the pixel is processed so that the same amount of yellow ink as that of particular color ink applied is applied as shown by a thick-broken line in FIG. 3. Alternatively, a table may be provided and used which is required to process data on the pixel so that the yellow ink is applied by varying the application rate in accordance with the print duty of the particular color ink as shown by a thick broken line in the figure.

In FIGS. 3 and 4, described above, the yellow ink is taken as an example of the basic color ink having a high weatherability and used with the particular color ink of the red hue. However, instead of the yellow ink or in addition to the yellow ink, the magenta ink may be used, which has a high weatherability. In view of red has a hue angle in a color representation area expressed by a mixture of yellow, and magenta, it is often preferable to use both yellow and magenta inks, in terms of color reproducibility. If both yellow and magenta inks are used, a table is suitably used which provides output results such as those shown above in FIG. 13.

Figure 14:
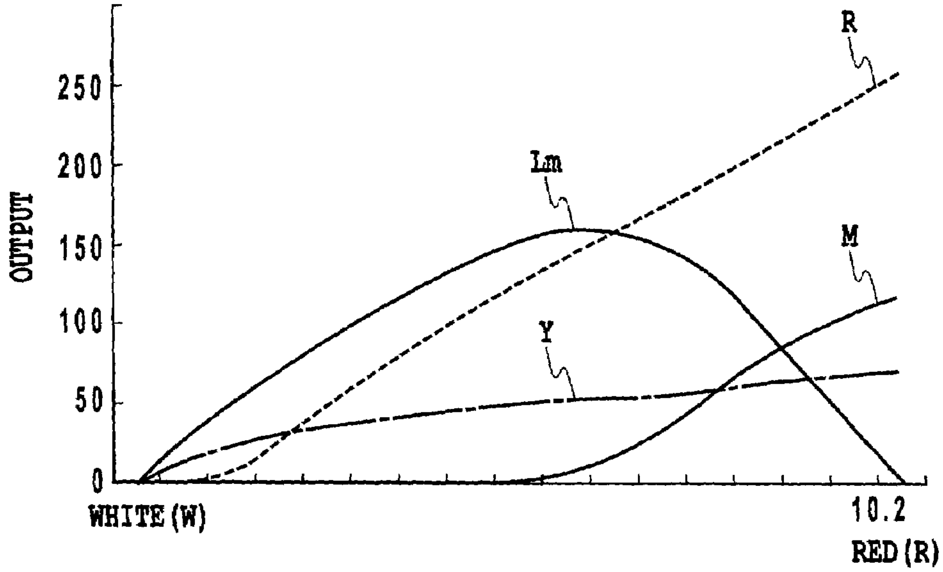
FIG. 14 is a graph illustrating red-hue output obtained using light magenta, yellow and magenta inks.

Further, in an aspect in which a light or photo magenta ink, having a lower color material density than the magenta ink, is used, the light magenta ink having a higher weatherability than the red ink may solely be used to be applied to the red ink, or the light magenta ink may be applied together-with another ink such as the yellow ink. For example, if the light magenta, yellow, and magenta ink as inks having a high weatherability are used with the red ink, the R hue line ranging from white (W) to red (R) may be configured as shown in FIG. 14. The axes of abscissa and ordinate in FIG. 14 are similar to those in FIG. 13. If the R hue line undergoes color reproduction as shown in FIG. 14, not only Lm data (data on light magenta) but also Y and M data are outputted. Thus, the R hue is subjected to color reproduction by using the red ink, having a low weatherability, and the light magenta, yellow, and magenta ink, each having a high weatherability. This makes it possible to improve the weatherability of an area exhibiting the R hue. In this example, large amounts of yellow and light magenta inks, giving a weaker granular impression, are used in a low density area (high light area). This makes it possible to suppress the dot granularity in the low density area (highlight area), which gives a stronger granular impression.

The above description is not applied only to red. If another particular color, for example, green, blue, or violet is used and has an insufficient weatherability, it is of course possible to allow an ink of the basic color cyan, magenta, or yellow to overlap the particular color ink. For example, if a green ink, having a relatively low weatherability, is used, it is preferable to avoid printing with only the green ink even for an area that can be expressed using only the green ink but to use, in addition to the green ink, an ink having a higher weatherability than the green ink. In particular, the cyan or yellow ink, each having a higher weatherability than the green ink, preferably overlaps the green ink. If a blue ink, having a relatively low weatherability, is used, it is preferable to avoid printing with only the blue ink even for an area that can be expressed using only the blue ink but to use, in addition to the blue ink, an ink having a higher weatherability than the blue ink. In particular, the cyan and magenta inks, each having a higher weatherability than the blue ink, preferably overlap the blue ink.

The high-weatherability ink overlapping the particular color ink may be applied to a printing medium before or after the particular color ink. That is, on the printing medium, the high-weatherability ink may overlap the particular color ink or the particular color ink may overlap the high-weatherability ink. In either aspect, it is possible to improve the weatherability of the image in the area to which the particular color ink is applied.

(General Construction of Mechanism of Image Forming Device)

General construction of the mechanism of the ink jet printing apparatus used as the image forming apparatus in the present embodiment will be explained below. A body of the printing apparatus according to the present embodiment comprises a paper feeding section, a paper feeding section, a carriage section, a paper discharge section, a cleaning section and an outer covering section for protecting the aforementioned sections and giving design to the apparatus, each section being named after a function thereof. Outlines of those sections will be explained below.

Figure 5:
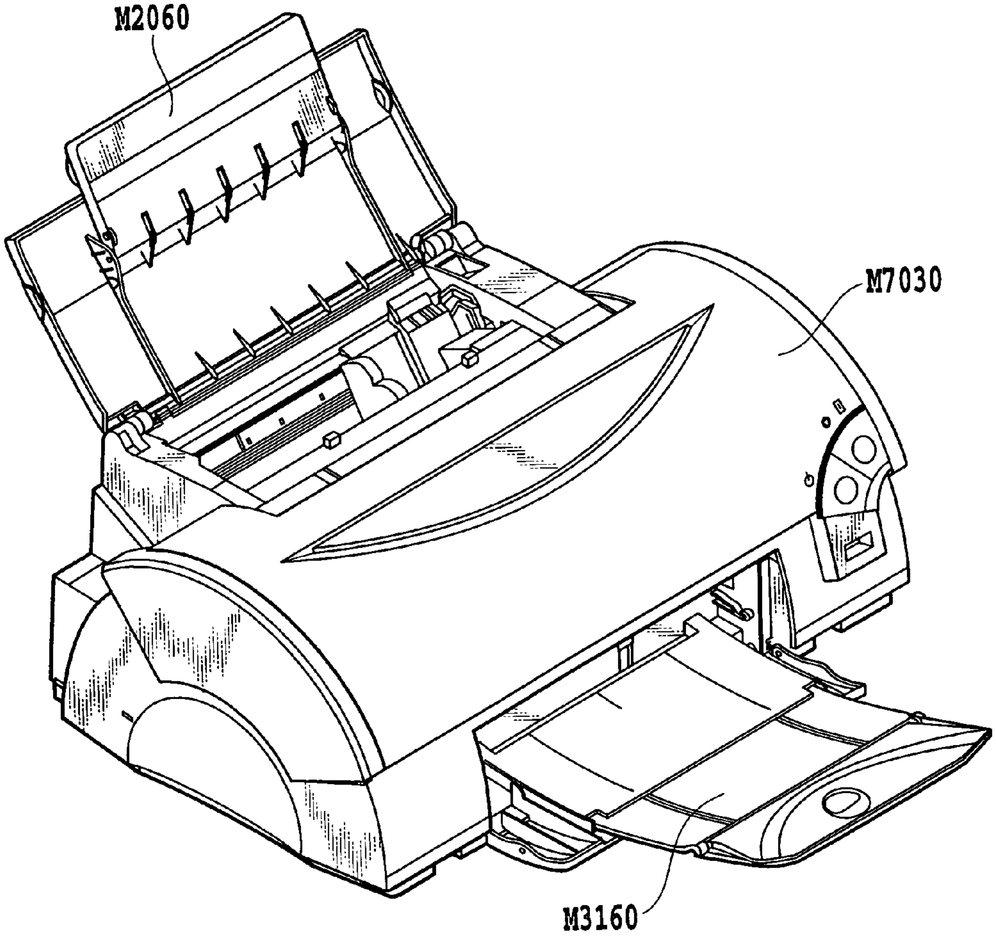
FIG. 5 is a perspective view of a printing apparatus according to an embodiment of the present invention.
Figure 6:
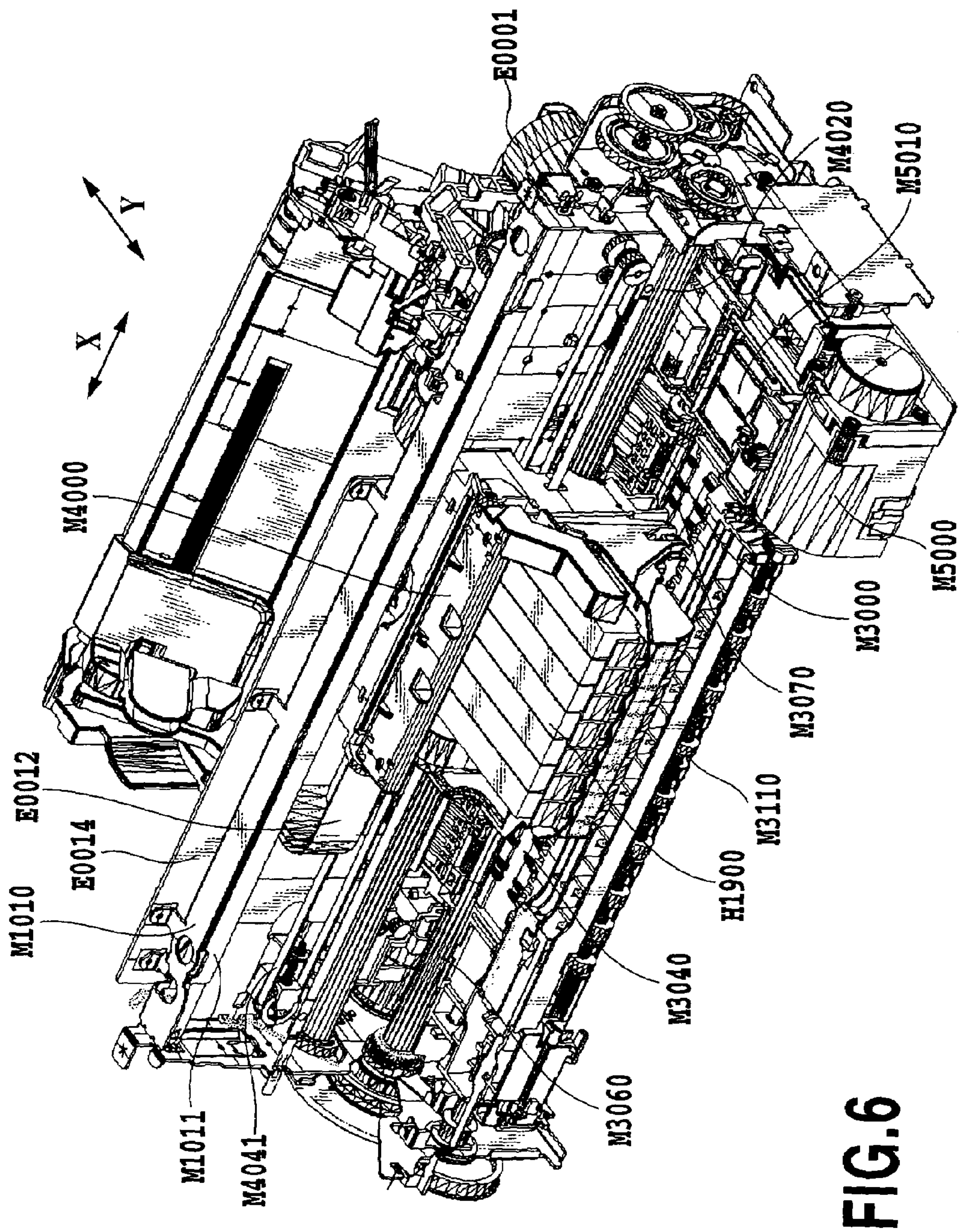
FIG. 6 is a perspective view of a mechanical part of the printing apparatus according to the embodiment of the present invention.
Figure 7:
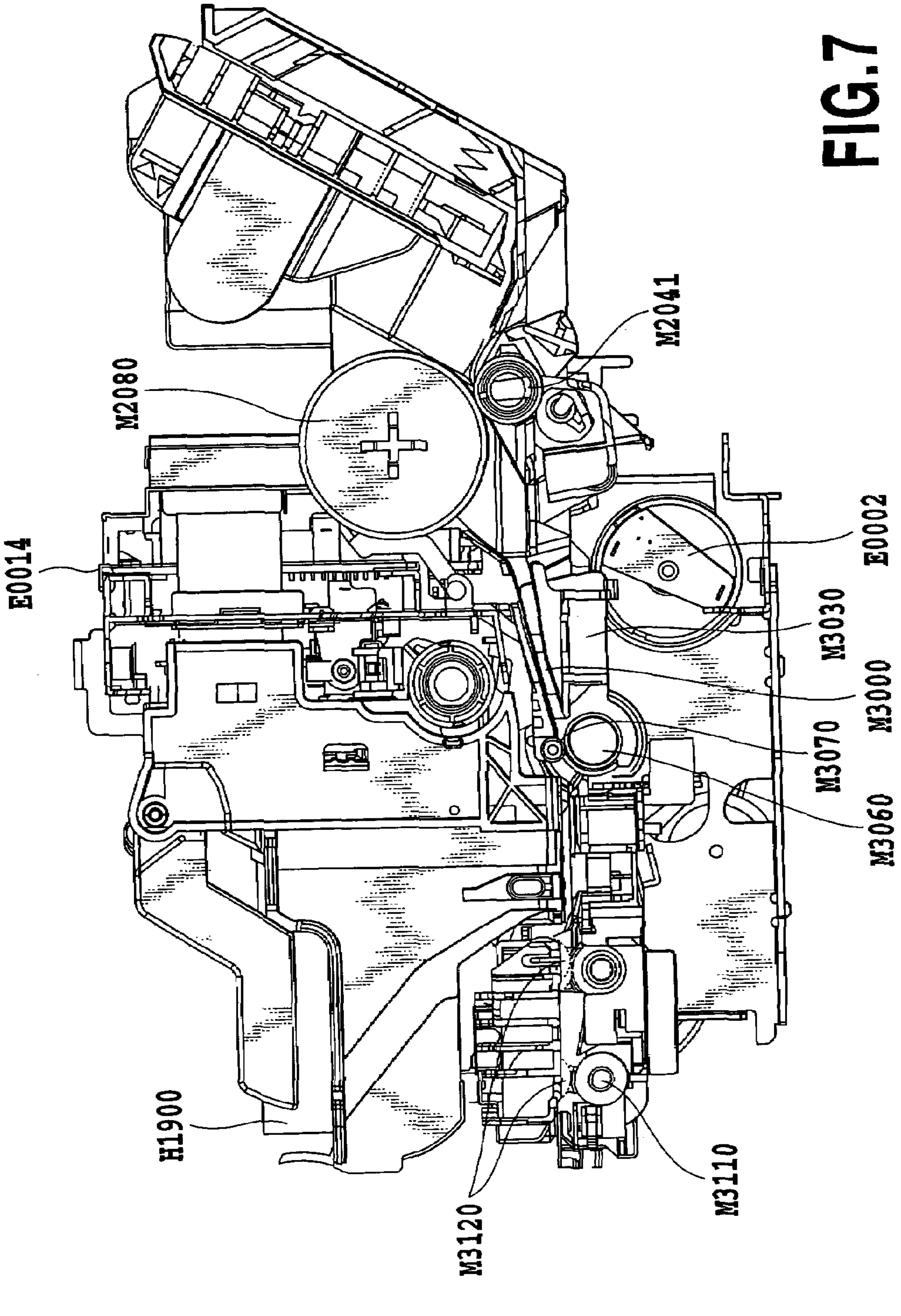
FIG. 7 is a sectional view of the printing apparatus according to the embodiment of the present invention.

FIG. 5 shows a perspective view of the printing apparatus applicable to the present embodiment. FIGS. 6 and 7 are views for explaining the inner mechanism of the body of the printing apparatus. FIG. 6 illustrates a perspective view as viewed from the upper right and FIG. 7 illustrates a side sectional view of the body of the printing apparatus, respectively.

Upon feeding printing medium in the printing apparatus applicable to the present embodiment, only a predetermined number of the printing media is fed to a nip portion composed of paper feeding roller 2080 and paper separating roller 2041 in the paper feeding section including a paper feeding tray M2060. The printing media having been delivered are separated at the nip portion and only the uppermost printing medium is delivered to the paper feeding section. The printing medium to be delivered to the paper feeding section is guided by pinch roller holder M3000 and paper guide flapper M3030, resulting in being sent to a pair of rollers consisting of feeding roller M3060 and pinch roller M3070. A pair of rollers consisting of feeding roller M3060 and pinch roller M3070 rotates by the driving of LF motor E0002. Rotations of the rollers cause the printing medium to be fed on platen M3040.

Figure 10:
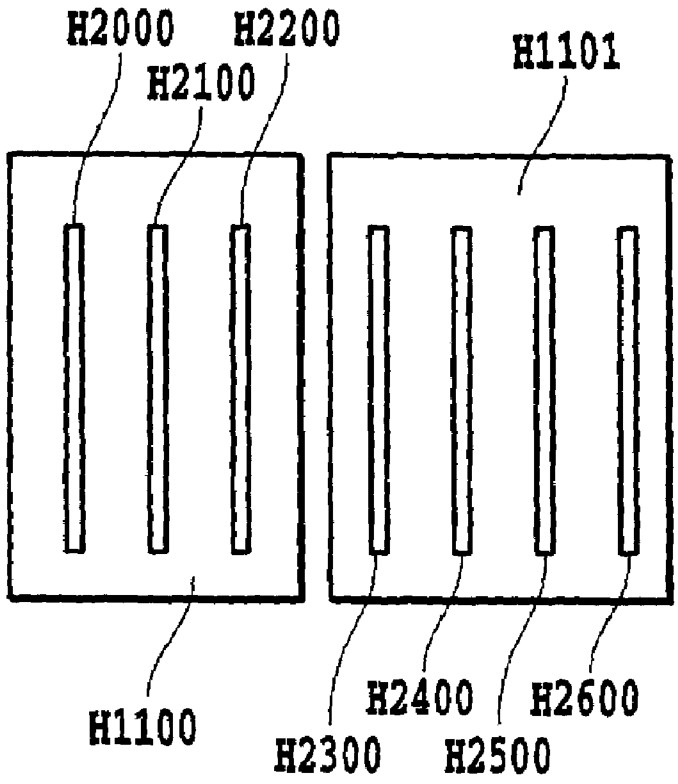
FIG. 10 is a front view of a print element substrate in the head cartridge applied according to the embodiment of the present invention.

In the present embodiment, either of the following modes can be employed: a bidirectional printing mode in which ink is ejected at each time main scan is performed in a forward main scanning direction and backward main scanning direction, thereby printing; and a one-way printing mode in which ink is ejected only at a time main scan is performed in either of the forward main scanning direction and backward main scanning direction, thereby printing. If the bidirectional printing mode is carried out using the printing heads as shown in FIG. 10, a first portion wherein an ink of good weatherability overlaps a particular ink and a second portion wherein a particular ink overlaps an ink of good weatherability are mixed on the printing medium. If the one-way printing mode is carried out using the printing heads as shown in FIG. 10, either one of the first portion and the second portion resides on the printing medium. An improved weatherability can be produced in both of the aforementioned modes. The present invention embraces the both modes.

The carriage section has carriage M4000 on which printing head H1001 is mounted. Carriage M4000 is supported by guide shaft M4020 and guide rail M1011. Guide shaft M4020 is attached to chassis M1010 in order to guide and support carriage M4000 to have the carriage scan reciprocately in a right-angle direction with regard to a feeding direction of the printing medium. Also, carriage M4000 is driven by carriage motor E0001 disposed on chassis M1010 via timing belt M4041. Further, carriage M4000 is connected to flexible cable E0012 for conveying driving signals from electric board E0014 to printing head H1001. With such a construction, when an image is formed on the printing medium, a pair of rollers consisting of feeding roller M3060 and pinch roller M3070 feed the printing medium to position it with regard to the feeding direction (a column direction). Furthermore, with regard to a scanning direction (a raster direction), carriage motor E0001 causes carriage M4000 to move in a direction perpendicular to the above stated feeding direction to place printing head H1001 (FIG. 8) at a targeted image forming position. The positioned printing head H1001, in accordance with the signals from electric board E0014, ejects ink onto the printing medium. A detailed configuration of printing head H1001 will be explained later. The printing apparatus according to the present embodiment has a construction to form an image on the printing medium by carrying out a main scan in which carriage M4000 scans while printing head H10001 performs a printing and a sub-scan in which feeding roller M3060 feeds the printing medium, the main scan and the sub-scan being performed repeatedly. The printing medium onto which the image formation has been finalized will be sandwiched at a nip portion between a first discharge roller M3110 and spur M3120 and then fed to discharge tray M3160 to be discharged.

In the cleaning section, if pump M5000 is activated in a state where cap M5010 is closely contacted to an ink ejection port for the purpose of cleaning of printing head H1001 prior to and/or after the image printing, useless ink and the like is suctioned from printing head H1001. Further, the printing head is configured to prevent anchoring of the remaining ink and an adverse effect that may occur by suctioning ink remaining at cap M5010 when cap M5010 is open.

(Configuration of Recording Head)

A configuration of head cartridge H1000 applicable to the present embodiment will be explained hereinafter.

Head cartridge H1000 according to the present embodiment comprises printing head H1001, means for mounting ink tank H1900, means for supplying ink from ink tank H1900 to the printing head, wherein the head cartridge is mounted to carriage M4000 in a detachable manner.

Figure 8:
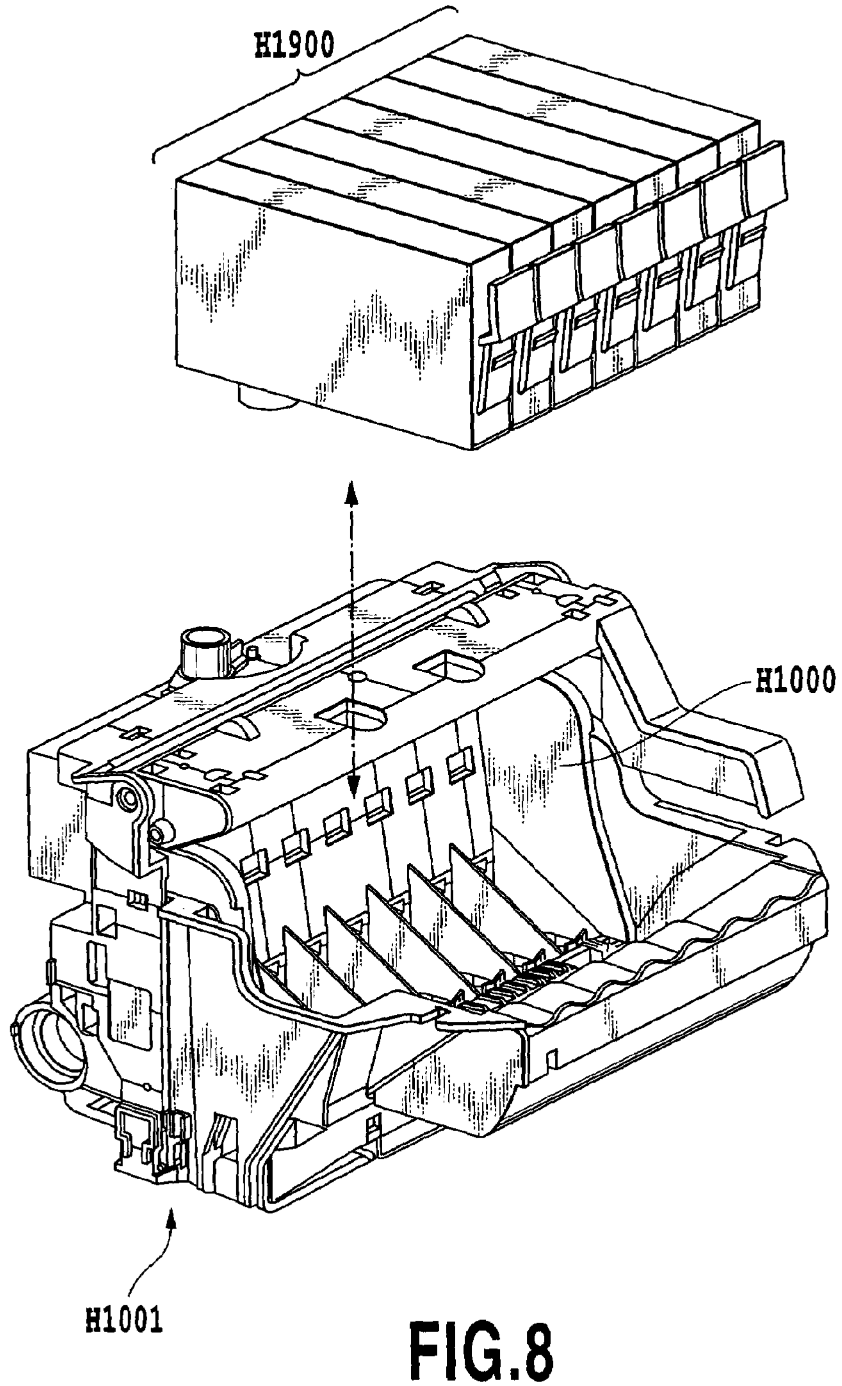
FIG. 8 is a perspective view showing how an ink tank is installed in a head cartridge applied according to the embodiment of the present invention.

FIG. 8 illustrates how to mount ink tank H1900 onto head cartridge H1000 applicable to the present embodiment. The printing apparatus of the present embodiment forms an image using seven color inks such as cyan, magenta, yellow, black, red, green and blue. Therefore, seven independent ink tanks H1900 for each of the colors are prepared. As shown in the figure, each ink tank is detachable with regard to head cartridge H1000. Detachment of each ink tank H1900 can be performed in a state where head cartridge H1000 is mounted on carriage M4000.

Figure 9:
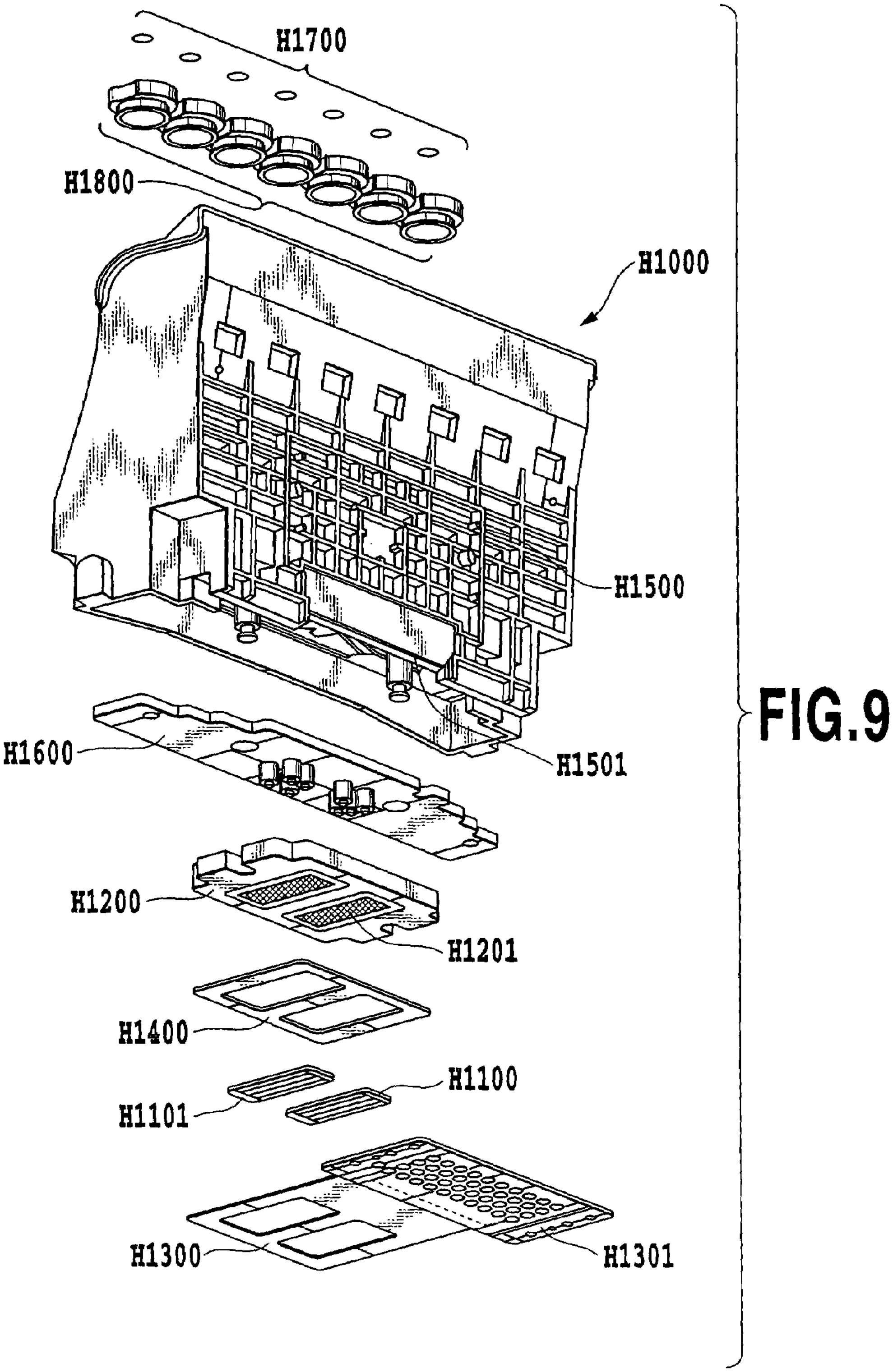
FIG. 9 is an exploded perspective view of the head cartridge applied according to the embodiment of the present invention.

FIG. 9 shows an exploded perspective view of head cartridge H1000. In the figure, head cartridge H1000 comprises first printing element board H1100, second printing element board H1101, first plate H1200, second plate H1400, electric circuit board H1300, tank holder H1500, flow path forming member H1600, filters H1700, sealing rubbers H1800 and the like.

First printing element board H1100 and second printing element board H1101 are Si boards, of which one side of each board is formed by photolithograpy with a plurality of printing elements (nozzles) for ejecting inks. Electric wiring for supplying electricity to each of the printing elements, such as Al, is formed by film forming techniques. A plurality of ink flow paths each corresponding to each of the printing element is also formed by photolithography. Ink supply ports for supplying inks to a plurality of ink paths are formed such that the ports open to rear faces of the printing element boards.

FIG. 10 is an enlarged view as viewed from a front of the first and second printing element boards H1100 and H1101 for explaining a configuration of the printing element boards. H2000-H2600 are arrays of printing elements (hereinafter, referred also to as nozzle arrays), each of printing elements corresponding to each of the different ink colors. First printing element board H 1100 is formed with nozzle arrays for three colors, i.e. nozzle array H2000 to be supplied with cyan ink, nozzle array H2100 to be supplied with magenta ink and nozzle array H2200 to be supplied with yellow ink. Second printing element board H1101 is formed with nozzle arrays for four colors, i.e. nozzle array H2300 to be supplied with black ink, nozzle array H2400 to be supplied with red ink, nozzle array H2500 to be supplied with green ink and nozzle array H2600 to be supplied with blue ink.

Each nozzle array has 768 nozzles aligning at interval of 1200 dpi (dot/inch) in the feeding direction of the printing medium, to eject ink droplets in an amount of about 2 picoliters. An opening area of each nozzle ejection port has been set to approximately 100 μm2,. Also, fist and second printing element boards H1100 and H1101 are bonded securely together with plate H1200, where ink supply ports H1201 are formed for supplying ink to the first and second printing element boards H1100 and H1101.

Further, first plate H1200 is bonded securely together with second plate H1400, the second plate having openings. Second plate H1400 retains electric circuit board H1300 such that an electric connection is established between electric circuit board H1300 and first and second printing element boards H1100 and H1101.

Electric circuit board H1300 applies electric signals to cause ink to be ejected from each of the nozzles formed on first and second printing element board H1100 and H1101. Electric circuit board H1300 includes electric wiring corresponding to first and second printing element board H1100 and H1101 and external signal input terminal H1301, being positioned at an end of the electric wiring, for receiving electric signals from the body of the printing apparatus. External signal input terminal H1301 is positioned on the rear face side of tank holder H1500 and secured thereat.

Flow path forming member H1600 is secured, for example by ultrasonic welding, to tank holder H1500 for holding ink tank H1900, resulting in a formation of ink flow path H1501 from ink tank H1900 to first plate H1200.

Filters H1700 are mounted at an end of ink tank side of ink flow path H1501 which engages with ink tank H1900, so that an invasion of dust from the outside can be prevented. Further, engagement sections with ink tanks H1900 are provided with sealing rubbers H1800, so that ink vaporization through the engagement sections can be prevented.

Head cartridge H1000 is configured by combining, for example by means of bonding or the like, the tank holder section comprising tank holder H1500, flow path forming member H1600, filters H1700 and sealing rubbers H1800 with printing head section H1001 comprising first printing element board H1100, second printing element board H1101, first plate H1200, electric wiring board H1400 and second plate H1400.

An ink ejection method of the printing head includes, as an example, a method employing an electrothermal transducer (printing element) for generating thermal energy which causes film boiling of ink in response to electric signals in order to eject ink. This method is applicable to both of the so-called on-demand type printing heads and continuous type printing heads. Specifically, for the on-demand type printing heads, at least one driving signal, which corresponds to printing information and induces sudden temperature rise that exceeds the nucleate boiling, is applied to the electrothermal transducer placed in association with a sheet or liquid flow path where liquid (ink) is retained. Accordingly, thermal energy is generated by the electrothermal transducer to cause film boiling to a heat effecting surface of the printing head. As such, the electrothermal transducer generates thermal energy to cause film boiling on the heat effecting surface of the printing head which results in bubble within the liquid (ink) corresponding one-by-one to each of the driving signal can be formed effectively. According to growth and/or shrink the bubbles, liquid (ink) is ejected through the ejection ports to form at least one droplet. If this driving signal is as a pulse type, the growth and/or the shrinkage of the bubbles can be done immediately and suitably. That is, liquid (ink) ejection, especially, of an excellent responsibility can be achieved and thus is more preferable.

Furthermore, as other ejection type printing heads, there may be on-demand type ink jet printing head comprising a nozzle forming board having a plurality of nozzles thereon, pressure generation elements composed of piezoelectric members and conductive members which are placed opposing the nozzles and ink filling the circumferences of the pressure generation elements, wherein the pressure generation elements are deformed by an application of an electric voltage and small ink droplets are ejected from the nozzles.

The ink jet printing apparatus is not limited to the apparatus in which the head and the ink tank are mounted separately, but can be an apparatus in which the head and the ink tank are integral with each other. Also, the ink tank may be mounted on the carriage either separately or integrally with regard to the printing head. The ink tank also may be disposed on a securing section of the ink jet printing apparatus to supply ink to the printing head via an ink supply member, e.g. tube.

When the ink tank is provided with a construction for exerting desired negative pressure to the printing head, a construction in which a suction body is placed in an ink retaining section of the ink tank or a construction having a flexible ink retaining bag and a spring section which generates an urging force in a direction a capacity of the bag expands can be employed.

As the printing apparatus, the serial printing type as stated above may be employed as well as a line printer in which printing elements are arranged over an area corresponding to the entire width of the printing medium.

(Inks)

Examples of inks preferred to be used in the present invention are shown hereinafter such as inks of yellow, magenta, cyan and black that are basic colors and particular colors such as red, green and blue inks. Those inks essentially include colorants.

As the colorants for the inks of the present invention, known colorants such as normally used dye or pigment or colorants newly compounded can be used by selection as required within the scope of the present invention.

Dyes and pigments can be used as colorants to be used for inks of the basic colors (three primary colors such as yellow, magenta and cyan in addition to black) according to the present embodiment. Especially, the dyes are excellent in reproducing colors of high lightness so that it is preferred to use them. Similarly, as the colorants for the inks of the particular colors (red, green and blue), the dyes and pigments can be used. Especially, the dyes are excellent in reproducing the colors having high lightness so that it is preferred to use them.

It is especially preferred to use ink of which colorant permeates into the printing medium after the attachment thereto (dye type ink is more likely to permeate into the printing medium) than to use ink of which colorant aggregates on a surface of the printing medium (pigment type ink is more likely to aggregates on the surface of the printing medium). In the latter, most of the incident light is reflected back from the uppermost ink layer which adheres at last, whereas in the former, the incident light is reflected back from each ink layer formed in the printing medium; so that a spatial effect and clarity are expected to appeal. Further, when ink droplets are attached to a glossy paper which is often used for photo-output or a glossy medium such as a glossy film, the colorant stays in a receiving layer and a status of a portion to which printing was done and a status of a portion to which printing was not done of the printing medium both are preserved, resulting in keeping the glossiness. In this regard, the glossy papers are preferable to form an image having a good texture corresponding to a silver-salt photo.

More preferable, the embodiments use dyes as colorants for the printing agents for basic colors such as yellow, magenta, cyan, especially, acid dye and direct dye. Particularly, acid dye and direct dye are suitably used since they are capable of producing a good development with various printing medium to be printed thereon, such as plain paper and special printing media including a coating layer or an ink receiving layer on the surfaces, the special printing medium being so-called glossy paper, coated papers, glossy films.

Further, the particular color ink is preferable since, by using an ink capable of expressing a high lightness higher than that of a color reproduction gamut expressed by a combination of the basic colors, it can effectively express an image formation having impact in which gamut is expanded by adding the particular color.

Specifically, if an image is formed using, for example, yellow and magenta inks and the particular color ink, then on CIE-L*a*b* color space, the color expressed by the particular color ink on the printing medium has a higher lightness than the color reproduction area expressed by an arbitrary combination of at least the yellow and magenta inks. Further, the hue angle of the color expressed by the particular color ink on the printed medium corresponds to red such as the one in the color reproduction area. Furthermore, preferably, the color expressed on the print medium by the red ink, which is the particular color ink, has a higher chroma saturation than the color reproduction area.

Figure 11:
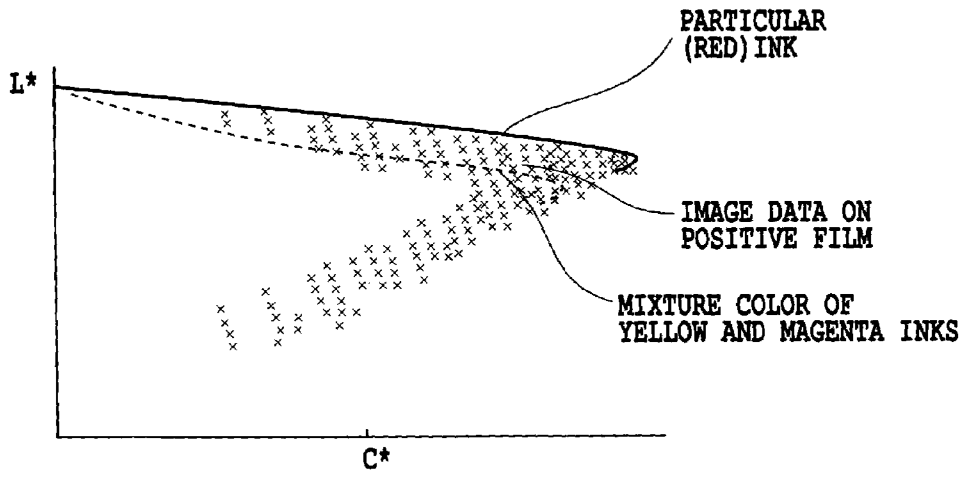
FIG. 11 is a graph schematically showing the relationship between the lightness and chroma of red, the color of the particular color ink, a color formed of a mixture of yellow and magenta, and a color expressed by a positive film.

FIG. 11 is a schematic view showing, for the purpose of explanation of this condition, a relationship between lightness (L*) and chroma ($c^*;c^*=(a^{*2}+b^{*2})^{1/2}$) of each of a color formed of red as the particular color, a mixture of yellow and magenta and a color expressed by a positive film. Use of inks capable of expressing colors of high lightness increases brightness of colors in orange or red area, resulting in that clarity and spatial effect of the printing medium can be expressed. On the other hand, if lightness is low, even if the orange or red area has an increased chroma saturation, only a printing image without good contrast and spatial effect can be produced. Hence, it is difficult to output a targeted image that corresponds to the image produced with the positive film. The above condition is similarly applicable to relationships of inks between yellow and cyan and green, and between magenta and cyan and blue.

In the present embodiment in which inks such as yellow, magenta, cyan, black, red, green and blue are used, these basic color inks and the particular color inks are exemplified as stated below, from which one suitable to the above condition can be selected.

Colorants for Cyan

C. I. direct blue: 1, 15, 22, 25, 41, 76, 77, 80, 86, 90, 98, 106, 108, 120, 158, 163, 168, 199, 226, 307

C. I. acid blue: 1, 7, 9, 15, 22, 23, 25, 29, 40, 43, 59, 62, 74, 78, 80, 90, 100, 102, 104, 112, 117, 127, 138, 158, 161, 203, 204, 221, 244

Colorants for Yellow

C. I. direct yellow: 8, 11, 12, 27, 28, 33, 39, 44, 50, 58, 85, 86, 87, 88, 89, 98, 100, 110, 132, 173

C. I. acid yellow: 1, 3, 7, 11, 17, 23, 25, 29, 36, 38, 40, 42, 44, 76, 98, 99

Colorants for Magenta

C. I. direct red: 2, 4, 9, 11, 20, 23, 24, 31, 39, 46, 62, 75, 79, 80, 83, 89, 95, 197, 201, 218, 220, 224, 225, 226, 227, 228, 229, 230

C. I. acid red: 6, 8, 9, 13, 14, 18, 26, 27, 32, 35, 42, 51, 52, 80, 83, 87, 89, 92, 106, 114, 115, 133, 134, 145, 158, 198, 249, 265, 289

C. I. food red: 87, 92, 94

C. I. direct violet 107

Other than the above, compounds or the like having structures as disclosed in Japanese Patent Laid-Open Publication No. 2002-069348 can also be used.

Colorants for Black

C. I. direct black: 17, 19, 22, 31, 32, 51, 62, 71, 74, 112, 113, 154, 168, 195

C. I. acid black: 2, 48, 51, 52, 110, 115, 156

C. I. food black: 1, 2 carbon black

Other than the above, compounds or the like having structures as disclosed in International Patent Publication No. WO00/43451 can also be used.

Colorants for Red

C. I. acid orange: 7, 10, 33, 56, 67, 74, 88, 94, 116, 142

C. I. acid red: 111, 114, 266, 374

C. I. direct orange: 26, 29, 34, 39, 57, 102, 118

C. I. food yellow: 3

C. I. reactive orange: 1, 4, 5, 7, 12, 13, 14, 15, 16, 20, 29, 30, 84

C. I. disperse orange: 1, 3, 11, 13, 20, 25, 30, 31, 32, 47, 55, 56

Other than the above, a mixture of the above colorants for yellow and magenta can be used if mixed properly.

Colorants for Green.

C. I. acid green: 5, 6, 9, 12, 15, 16, 19, 21, 25, 28, 81, 84

C. I. direct green: 26, 59, 67

C. I. food green: 3

C. I. reactive green: 5, 6, 12, 19, 21

C. I. disperse green: 6, 9

C. I. disperse orange: 1, 3, 11, 13, 20, 25, 30, 31, 32, 47, 55, 56

Other than the above, a mixture of the above colorants for yellow and cyan can be used if mixed properly.

Colorants for Blue

C. I. acid blue: 62, 80, 83, 90, 104, 112, 113, 142, 203, 204, 221, 244

C. I. reactive blue: 49

C. I. pigment blue 15: 6

C. I. acid violet: 19, 48, 49, 54, 129

C. I. direct violet: 9, 35, 47, 51, 66, 93, 95, 99

C. I. reactive violet: 1, 2, 4, 5, 6, 8, 9, 22, 34, 36

C. I. disperse violet: 1, 4, 8, 23, 26, 28, 31, 33, 35, 38, 48, 56

Other than the above, a mixture of the above colorants for magenta and cyan can be used if mixed properly.

A content of the above colorants to be included in the ink is suitable in a range between 0.1 and 15 percent by mass with regard to the entire mass of ink. Also, the colorants to be included in the ink can be used singularly or in a mixture of two or more colorant. Also, colorants to be used for the particular colors are used as required in the scope of the present invention selectively from a single colorant, a mixture of two or more of the colorants having similar hues, a mixture of the colorants each having hue of yellow, magenta and cyan, or the like.

Furthermore, as required, inks used in the ink jet printing apparatus of personal use may include, for example, water as carrier ingredient in addition to water-soluble organic solvent, humectant, surface-active agent, pH adjuster, antiseptic agent and the like.

There is any water-soluble organic solvent can be used without limitation as far as it is water-soluble, so that any solvent as normally used as an ink used in the ink jet printer such as alcohol, poly alcohol, polyglycol, glycol ether, nitrogenous polar solvent, sulfurous polar solvent, urea, saccharides and derivatives thereof may be used without problem. These solvents are used for the purpose of maintaining ink-moisture retention, improving solubility, dispersion property of colorants, and ink permeating agent into printing medium. Further, these solvents can be used separately or a combination of a plurality of the solvents.

An amount of water-soluble organic solvent is normally preferable between land 50 percent by mass, more preferably between 3 and 40 percent by mass. Also, the amount of water included in ink is preferably between 30 and 95 percent by mass for a suitable retention of the solubility of colorant and ejection stability of ink.

Further, surface-active agent includes negative ion surface active agent such as fatty acid salts, salts of sulfate esters of higher alcohols, liquid fatty oil alkyl sulfates, alkyl aryl sulfonates, and non-ionic surface-active agent such as polyoxyethylene alkyl ethers, polyoxyethylene alkyl esters, polyoxyethylene sorbitan alkyl esters, acetylene alcohol, acetylene glycol. One or more of those agents can be used as required. More specifically, acetylene alcohol or acetylene glycol is preferred to be used since they have an excellent permeability to plain paper. An amount of such agents to be used is preferably between 0.01 and 5 percent by mass, although the preferable amount thereof defers according to a kind of surface active agent to be used. Here, a preferable amount of the surface active agent to be added is determined such that a preferable surface tension of ink at 25 degree of the ink temperature is 10 mN/m(dyn/cm) or more, more preferably 20 mN/m or more, and the surface tension does not exceed 60 mN/m. This is because the ink jet printing mode used in the present invention is capable of effectively preventing the occurrence of kink of printing (deviation of landing point of ink droplet) due to wet condition of nozzle end.

Furthermore, to produce a good ejecting property in the ink jet printing apparatus, it is preferable that ink is adjusted so as to have a desired viscosity and pH.

(Printing Medium)

The printing medium that can be used in the present invention are normally used a printing medium such as a special medium having a coating layer or an ink receiving layer on a surface thereof, that is so-called plain paper, or glossy paper, coated paper and glossy film. Among those, an example of the print medium that can produce an image having better brightness, contrast and clarity is a special medium having a hydrophilic porous particle layer and porous polymer molecule layer and the like on a base material.

The example of the special medium for the printing medium used in the present invention is described in details hereinafter. The special medium has a structure to cause the colorants such as dye and pigment to adhere to particles having hydrophilic porous structure within the ink receiving layer to form an image by the at least the colorants adhered. Such special medium is especially suitable to be used for an ink jet printing method. As the printing medium such as stated above, a so-called absorbing type in which a space formed in the ink receiving layer on a supporting body absorbs ink is preferred.

The ink receiving layer of the absorbing type printing medium is structured to have particles as a main structure and as required the structure includes hydrophilic porous layer for holding binder or the other type of additives. The particles are exemplified by inorganic pigment such as silica, clay, talc, calcium carbonate, kaolin, alminium oxide such as almina or almina hydrate, diatomite, titanium oxide, hydrotalcite, zinc oxide and organic pigment such as urea formalin resin, ethylene resin, styrene resin. One or more of those may be used.

A suitable binder to be used includes water-soluble high polymer and latex. For example, the followings are used independently or in a combination of two or more of them: polyvinyl alcohol or derivatives thereof, starch or derivatives thereof, gelatin or derivatives thereof, acacia gum, cellulose derivatives such as carboxymethyl cellulose, hydroxyethyl cellulose and hydroxypropylmethyl cellulose, SBR latex, NBR latex, methyl methacrylate-butadiene copolymer latex, vinyl copolymer latex such as ethylene-vinyl acetate copolymer, polyvinyl pyrolidone, maleic anhydride and copolymer thereof, acryl ester copolymer and etc. Other than the above, additives can be also used as required, for example, dispersing agent, bodying agent, pH controlling agent, lubricant, flow denaturant, surface active agent, antifrothing agent, die lubricant, fluorescent bleach, ultraviolet absorber, antioxidant are also used.

Other Embodiments

In the above embodiments, the inks are described as an example of printing agents, and the ink jet printing apparatus is described by way of example of an image forming apparatus. However, the printing agents that can be used in the present invention are not limited to the inks. The image forming apparatus that can be used in the present invention is not limited to the ink jet printing apparatus. For example, the printing agents may be toners and the image forming apparatus may be a copying machine.

In the above described embodiments, mainly described is the case in which the inks of the seven colors red, green, blue, cyan, magenta, yellow, and black are used. However, the inks used are not limited to this combination as mentioned above. For example, a color other than the three colors red, green, and blue may be used as a particular color ink. Alternatively, at least only one of the three colors red, green, and blue may be used. Further, the inks other than the particular color ink (cyan, magenta, yellow, and black) are not limited to the above described example. For example, light cyan or light magenta may be used or black may be omitted.

For example, if seven colors including cyan, light cyan, magenta, light magenta, yellow, black, and red (particular color) are used, a gamut that can be expressed using only the red ink is preferably printed using both the red ink and at least one of three color magenta, light magenta, and yellow inks, which have a higher weatherability than the red ink. In particular, if the three inks magenta, light magenta, and yellow are used, a table providing output results such as those shown in FIG. 14, described above, is suitably used during the subsequent process. Further, if green is added to these seven colors, an area that can be expressed using only the green ink is preferably printed using the green ink and at least one of three inks including cyan, light cyan, and yellow, having a higher weatherability than green.

Further, in the example shown in the above embodiment, the process of applying the particular color ink and the basic color ink to the same pixel is executed during subsequent process J0003. However, the present invention is not limited to this aspect. For example, in any of the steps executed between the binarization process and the driving of the head, a control for printing dots of the basic color ink, having a high weatherability, to overlap respective dots of the particular color ink may be performed. Specifically, it is possible to create binary data on the basic color ink (for example, binary Y data) on the basis of binary data on the particular color ink (for example, binary R data), besides binary data on the basic color ink (for example, binary Y data) which is created through subsequent process J0003 or halftonning J0005. This configuration enables the basic color ink to be reliably applied to all the pixels to which the particular color ink is applied. Alternatively, control may be performed so that the basic color ink is applied to some of the pixels to which the particular color ink is applied.

Still further, such printing system should also be considered as being embraced in the scope of the present invention that the system for supplying a software which realizes the functions of the embodiments as stated above or the program code of printer driver to a machine connected to various devices including the printing apparatus or the computer in the system, to cause various devices activated by the program code stored in the machine or the computer of the system, thereby realizing the function of the embodiments stated above.

In the above structure, the program code itself achieves a new function of the present invention. The program code itself, and means for supplying such program code to the computer via communication and storage media all are encompassed within the scope of the present invention.

As the storage medium for supplying the program code, any of the following mediums can be utilized: for example, flexible disks, DC-ROMs and others such as hard disks, optical disks, optical magnetic disks, CD-Rs, DVDs, magnetic tapes, nonvolatile memory cards and ROMs.

Also, the present invention includes not only the case that execution of the program code read out by the computer achieves the functions of the embodiment stated above, but also includes the case that, based on the instruction of the program code, OS and the like being activated on the computer performs a part or all of the actual processes, thereby realizing the functions of the present embodiment.

Furthermore, the scope of the present invention also encompasses the case that the program code read out from the storage medium is written in a memory stored in a function expanding board inserted into the computer or a function expanding unit connected to the computer, and then, based on the instruction of the program code, CPU or the like incorporated into the function expanding board or the function expanding unit performs a part or all of the actual processes, thereby achieving the function of the present embodiment.

Additionally, a configuration of the printing system may includes, regardless of personal use, business use or industrial use, an image data supplying device such as computer, scanner and digital camera and a printer as an image output terminal, in addition to, for example, a copying machine having a scanner and a printing apparatus all in one, a facsimile machine having a data transfer device and a printer all in one, a word processor or electric typewriter each having a printer, and a digital camera having a printer in one.

EXAMPLES

A detailed description will be given below using examples. However, the present invention is not limited by the examples below. The examples may be varied without departing from the spirit of the present invention.

In the description below, "%" denotes a mass base unless otherwise specified.

Example 1

Predetermined amounts of dyes described in Table 1, shown below, were provided. Components having respective compositions shown below were added to the respective dyes. Water was then mixed into the dyes so that the total amount was 100 parts. The mixtures were then sufficiently agitated and dissolved. Subsequently, the mixtures were filtered under pressure using a microfilter of pore size 0.2 μm (manufactured by FUJI PHOTO FILM CO., LTD.). Thus, an ink of yellow as a basic color and an ink of red as a particular color were prepared.

Compositions of Yellow and Red Inks

- Glycerin: 10 parts
- Diethyleneglycol: 10 parts
- Acetyleneglycol ethylene oxide additive: 1 part (Trade name: Acetylenol EH; manufactured by Kawaken Fine Chemicals Co., Ltd.)
- Dye: Predetermined amount part
- Water: Remaining part

TABLE 1

| Color | Dye | Amount added |
|---|---|---|
| Yellow ink | CI. direct yellow 132 | 3 parts |
| Red ink | CI. food yellow 3 | 4.5 parts |

Images were formed using the above yellow ink and particular color ink, PR101 (manufactured by Canon Inc.) as printing media, and a modified PIXUS 950i (manufactured by Canon Inc.) as an ink jet image forming apparatus. Then, the images were evaluated as described below. L*, a*, b* measurements of the images were carried out using Spectrolino, manufactured by Gretag Macbeth. The measurement conditions were as follows: observation light source: D50, observation visual field: 2 degrees, density: ANSI A, white reference: Abs, and filter: No.

In the example, only the yellow and red inks of the above ink set were used to execute what is called solid printing with a 50% duty. A 100% duty in this case refers to the case in which one dot is applied to every one of the pixels at a resolution of 2,400×1,200 dpi. A 50% duty in this case refers to the case in which one dot is applied to every one of the pixels at a resolution of 1,200×1,200 dpi. In the present example, 2.5 ng of ink was applied to one dot. Accordingly, with the 50% duty, 3.6 mg of ink was applied to a unit area of 1 square inch.

Patch patterns of 16 gradations at a 0 to 100% duties were formed by using only the particular color ink or allowing the yellow ink to overlap the particular color ink. In this case, used were the gradation patterns with the overlapping of the yellow ink included patterns in which the same amount of yellow ink as that of particular color ink was applied and patterns in which the application ratio of the yellow ink to the particular color ink (yellow duty/particular color duty) was varied step by step depending on the print duty of the particular color ink.

In this case, in subsequent process J0003, image data was created in which the same pixel contained data on the particular color and yellow inks corresponding to respective output values. The image data was then subjected to image processing as previously described (halftonning, dot pattern arrangement, and the like). The processed data was then outputted to the above described image forming apparatus.

FIG. 4 shows the print ratio of the yellow ink to the particular color ink at each print duty of the particular color ink according to the present example. A patch pattern with only the particular color ink and a patch pattern in which the yellow ink overlapped the particular color ink were printed and then left in an indoor dark place for 48 hours. Then, fading tests were carried out under the conditions described below.

Photobleach Test Conditions

A xenon wetherometer Ci4000 (manufactured by Atlas) with inner and outer filters of S-Type borosilicate glass was used to execute exposure irradiation for 30 hours at a bath temperature of 50° C., a relative humidity of 70%, and an irradiation energy of 0.39 W/m$^2$ at 340 nm. Prints were subjected to colorimetry before and after the tests as previously described to determine the color difference ΔE(CIE-L*a*b*).

The ratio ΔE2/ΔE1 of the ΔE1 of the particular color ink at the 50% duty to the ΔE2 of the yellow ink at the 50% duty was 0.27. This indicates that the yellow ink has a sufficiently higher weatherability than the particular color ink.

FIG. 3 shows the ΔE, at each print duty, of the gradation pattern with only the particular color ink and the gradation pattern in which the yellow ink overlapped the particular color ink.

These results indicate that the weatherability is significantly improved by allowing the yellow ink, having a high weatherability, to overlap the particular color ink. Further, by increasing the application rate of the yellow ink, having a high weatherability, from a high duty part to a low duty part, it is possible to further improve the weatherability and to reduce the total amount of ink used in the high duty part, to which a large amount of ink must be applied.

Example 2

Inks, printing media, an image processing method, and an image forming apparatus all of which are similar to those in Example 1 were used to print two patch patterns of 16 gradations at a 0 to 100% duties; one patch pattern being printed using only the particular color ink and the other being printed using the yellow ink overlapped the particular color ink. In this case, in the gradation pattern in which the yellow ink overlapped the particular color ink, the color material density of the yellow ink applied in connection with the particular color ink was 0.05 mg per square inch (reference value). The patch patterns were printed and then left in an indoor dark place for 48 hours. Then, brown-ring tests were carried out under conditions similar to those in Example 1.

Figure 12:
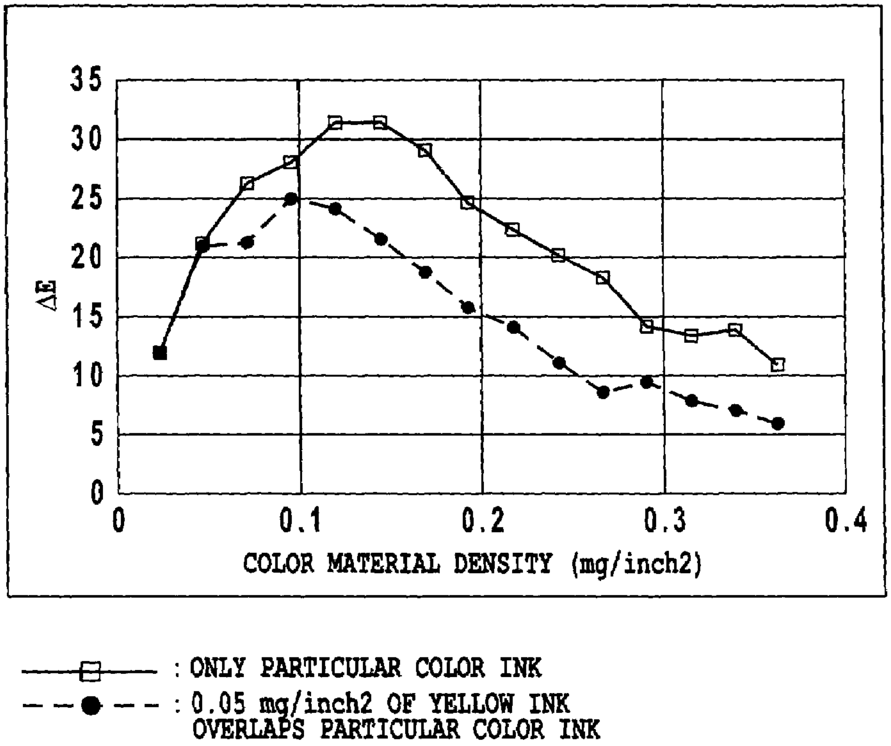
FIG. 12 is a graph showing the relationship between the duty of printing executed according to a third embodiment and the densities of dyes applied to printing media into which the concentrations of the color materials of the inks have been converted.

FIG. 12 shows the relationship between ΔE and the density of the particular color ink applied to a printing medium with each pattern. The results show that the weatherability is clearly improved even if the amount of a color material applied to an area to which the particular color ink is applied is 0.05 mg per square inch, the color material being contained in the yellow ink, having a high weatherability.

Example 3

A cyan, magenta, and black inks, described later, were added to the yellow and red inks in Example 1 to form two types of images titled "1. Scenery of Sunset" and "2. Scenery of Colored Leaves" as full-color nature images. The images were formed using yellow, magenta, cyan, red, and black. In this case, the three-dimensional LUT and interpolating operations in subsequent process J0003 were configured so that at the same time when data on the red ink was contained in the pixel data, data on the yellow ink was contained in the pixel data. That is, the three-dimensional LUT and interpolating operations were configured as follows: in subsequent process J0003, when 8-bit RGB data is converted into 8-bit color separation data (CMYKR data), even if a color expressed by the unconverted RGB data can be reproduced using only the red ink, the RGB data is converted into R and Y data rather than only R data. In other words, when 8-bit RGB data is converted into 8-bit color separation data CMYKR for output, the three-dimensional LUT and interpolating operations in subsequent process J0003 are configured so as to also output Y data if R data is outputted. Accordingly, even a gamut that can be expressed using only the red ink is printed using both the red ink and at least the yellow ink, having a high weatherability, rather than only the red ink.

PR101 (manufactured by Canon Inc.) was used as printing media for image formation, and the modified PIXUS 950i (manufactured by Canon Inc.) as an ink jet image forming apparatus. In the examples, the yellow ink was installed at the position of a yellow ink tank, the magenta ink was installed at the position of a magenta ink tank, and the cyan ink was installed at the position of a cyan ink tank.

The particular color ink was installed at the position of a photo magenta ink tank, and the black ink was installed at the position of a black ink tank.

Cyan Ink

- Glycerin: 10%
- Diethyleneglycol: 10%
- Acetyleneglycol ethylene oxide additive: 1% (Trade name: Acetylenol EH; manufactured by Kawaken Fine Chemicals Co., Ltd.)
- Direct Blue 199: 3%
- Water: 76%

Magenta Ink

- Glycerin: 10%
- Diethyleneglycol: 10%
- Acetyleneglycol ethylene oxide additive: 1% (Trade name: Acetylenol EH; manufactured by Kawaken Fine Chemicals Co., Ltd.)
- Compound illustrated below: 3%
- Water: 76%

Illustrated Compound

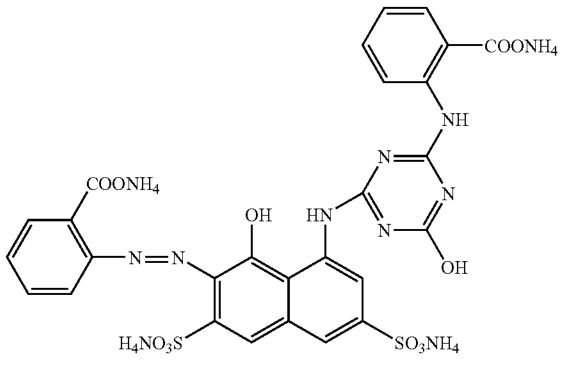

Black Ink

Glycerin: 10%

Diethyleneglycol: 10%

Acetyleneglycol ethylene oxide additive: 1% (Trade name: Acetylenol EH; manufactured by Kawaken Fine Chemicals Co., Ltd.)

Food Black 2: 3%

Water: 76%

In Example 3, two types of output images were visually evaluated for "vividness". For comparative example, the inks of the ink set except the red ink, that is, the yellow, cyan, magenta, and black inks were used output the same images. Then, evaluations were carried out using the output images as a reference. The two types of output images in Example 3 were confirmed to be more vivid and more excellent than the comparative 4-color images in three-dimensionality and transparency.

The present invention has been described in detail with respect to preferred embodiments, and it will now be apparent from the foregoing to those skilled in the art that changes and modifications maybe made without departing from the invention in its broader aspect, and it is the intention, therefore, in the apparent claims to cover all such changes and modifications as fall within the true spirit of the invention.

This application claims priority from Japanese Patent Application No. 2003-291868 filed Aug. 11, 2003, which is hereby incorporated by reference herein.

What is claimed is:

1. A method of forming an image on a printing medium using printing agents for basic colors including cyan, magenta, and yellow and a printing agent for a particular color having a hue different from those of said basic colors, wherein at least one basic color printing agent having a higher weatherability than said particular color printing agent is applied to an area on said printing medium to which said particular color printing agent is then applied.

2. A method of forming an image on a printing medium using printing agents for basic colors including cyan, magenta, and yellow and a printing agent for a particular color exhibiting, in a CIE-L*a*b* space, a hue angle within a color reproduction area expressed by two of said three basic colors, wherein if an image which contains a color within the color reproduction area expressed by said two basic colors is formed, said particular color printing agent and at least one of said basic color printing agents, which has a higher weatherability than said particular color printing agent are used.

3. A method of forming an image on a printing medium using printing agents for basic colors including cyan, magenta, and yellow and a printing agent for a particular color having a hue different from those of said basic colors, the method comprising:

a step of generating pixel data corresponding to one pixel expressed using said particular color printing agent, and wherein in the step of generating said pixel data, said pixel data is generated so that data corresponding to said particular color printing agent and data corresponding to data on at least one basic color printing agent having a higher weatherability than said particular color printing agent are contained.

4. A method of forming an image on a printing medium using printing agents for basic colors including cyan, magenta, and yellow and a printing agent for a particular color exhibiting, in a CIE-L*a*b* space, a hue angle within a color reproduction area expressed by two of said three basic colors, the method comprising:

a step of converting RGB data corresponding to one pixel into pixel data corresponding to printing agents used for said image formation and then outputting the pixel data, and wherein in said step, if pixel data which corresponds to a color within the color reproduction area expressed by said two basic colors is outputted, said RGB data is converted into the pixel data so that data corresponding to said particular color printing agent and data corresponding to data on at least one basic color printing agent having a higher weatherability than said particular color printing agent are contained in the pixel data to be outputted.

5. A method of forming an image on a printing medium using printing agents for basic colors including cyan, magenta, and yellow and a printing agent for a particular color having a hue different from those of said basic colors, the method comprising:

a step of converting multivalued RGB data into multivalued data corresponding to the printing agents used for the image formation; and a step of executing predetermined image processing on the multivalued data corresponding to said printing agents to obtain binary data and applying said printing agents to said printing medium on the basis of the binary data, and wherein in said converting step, even if a color expressed by the unconverted RGB data can be expressed using only said particular color printing agent, said multivalued RGB data is converted into multivalued data corresponding to said particular color printing agent and multivalued data corresponding to at least one basic color printing agent having a higher weatherability than said particular color printing agent.

6. A method of forming an image according to claim 1, wherein said at least one basic color printing agent is at least one of the printing agents for two of said three basic colors between which the hue angle of said particular color is sandwiched.

7. A method of forming an image according to claim 1, wherein with increasing density level, the amount of said particular color printing agent used increases and the ratio of the amount of said at least one basic color printing agent used to the amount of said particular color printing agent used decreases.

8. A method of forming an image according to claim 1, wherein predetermined images are formed using said particular color printing agent and said at least one basic color printing agent, and prints obtained are then subjected to a predetermined fading test, and when color differences between a state before the fading test and a state after the fading test are defined as $\Delta E2$ and $\Delta E1$, respectively, then $\Delta E2/\Delta E1=0.8$.

9. A method of forming an image according to claim 1, wherein said particular color printing agent provide a color which can express, in a CIE-L*a*b* space, a higher lightness than a color reproduction area expressed on a printing medium by a combination of two colors of said three basic colors and which exhibits a hue angle within the color reproduction area expressed by the combination of two colors.

10. An image forming apparatus comprising:

means for mounting means for applying printing agents for basic colors including cyan, magenta, and yellow and a printing agent for a particular color having a hue different from those of said basic colors; and means for forming an image on a printing medium by performing a method according to claim 1.

11. A program stored in a computer readable medium for causing a computer to generate data used for forming an image on a printing medium using printing agents for basic colors including cyan, magenta, and yellow and a printing agent for a particular color having a hue different from those of said basic colors, the program including codes for performing a step of generating pixel data corresponding to one pixel expressed using said particular color printing agent, and wherein in the step of generating said pixel data, said pixel data is generated so that data corresponding to said particular color printing agent and data corresponding to data on at least one basic color printing agent having a higher weatherability than said particular color printing agent are contained.

12. A program stored in a computer readable medium for causing a computer to generate data used for forming an image on a printing medium using printing agents for basic colors including cyan, magenta, and yellow and a printing agent for a particular color exhibiting, in a CIE-L*a*b* space, a hue angle within a color reproduction area expressed by two of said three basic colors, the program including codes for performing a step of converting RGB data corresponding to one pixel into pixel data corresponding to printing agents used for said image formation and then outputting the pixel data, and wherein in said step, if pixel data which corresponds to a color within the color reproduction area expressed by said two basic colors is outputted, said RGB data is converted into the pixel data so that data corresponding to said particular color printing agent and data corresponding to data on at least one basic color printing agent having a higher weatherability than said particular color printing agent are contained in the pixel data to be outputted.

13. A program stored in a computer readable medium for causing a computer to generate data used when forming an image on a printing medium using printing agents for basic colors including cyan, magenta, and yellow and a printing agent for a particular color having a hue different from those of said basic colors, the program including codes for performing a step of converting multivalued RGB data into multivalued data corresponding to the printing agents used for the image formation; and wherein in said converting step, even if a color expressed by the unconverted RGB data can be expressed using only said particular color printing agent, said multivalued RGB data is converted into multivalued data corresponding to said particular color printing agent and multivalued data corresponding to at least one basic color printing agent having a higher weatherability than said particular color printing agent.

* * * * *